(12) United States Patent
Sartori et al.

(10) Patent No.: US 10,764,876 B2
(45) Date of Patent: *Sep. 1, 2020

(54) SYSTEM AND METHOD FOR TRANSMITTING AND RECEIVING CONTROL CHANNELS

(71) Applicant: Futurewei Technologies, Inc., Plano, TX (US)

(72) Inventors: Philippe Sartori, Plainfield, IL (US); Bingyu Qu, Shenzhen (CN); Weimin Xiao, Hoffman Estates, IL (US); Brian Classon, Palatine, IL (US); Vipul Desai, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/149,689

(22) Filed: May 9, 2016

(65) Prior Publication Data

US 2016/0255612 A1 Sep. 1, 2016

Related U.S. Application Data

(63) Continuation of application No. 13/436,590, filed on Mar. 30, 2012, now Pat. No. 9,338,730.

(Continued)

(51) Int. Cl.
*H04W 72/04* (2009.01)
*H04W 24/10* (2009.01)
*H04W 48/12* (2009.01)

(52) U.S. Cl.
CPC ......... *H04W 72/042* (2013.01); *H04W 24/10* (2013.01); *H04W 48/12* (2013.01); *H04W 72/0406* (2013.01)

(58) Field of Classification Search
CPC .... H04W 72/042; H04W 24/10; H04W 48/12
See application file for complete search history.

(56) References Cited

U.S. PATENT DOCUMENTS 8,204,512 B2 6/2012 Dietrich et al.
8,433,251 B2 4/2013 Chen et al.
(Continued)

FOREIGN PATENT DOCUMENTS

| CH | 101868003 A | 10/2010 |
|---|---|---|
| CN | 101589582 A | 11/2009 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.1.0, Mar. 2011, 103 pages.

(Continued)

*Primary Examiner* — Kodzovi Acolatse
*Assistant Examiner* — Jay L Vogel
(74) *Attorney, Agent, or Firm* — Slater Matsil, LLP

(57) ABSTRACT

A method for transmitting resource allocation information to a wireless node in a communications system includes selecting a search space from one of a first search space and a second search space, the first search space associated with a first set of control channel parameters and the second search space associated with a second set of control channel parameters. The method also includes modulating the first control information, and mapping the modulated first control information onto the selected search space in a first subframe, where at least one of modulating the first control information and mapping the modulated first control information is according to a selected set of control channel parameters associated with the selected search space. The (Continued)

method further includes transmitting the first subframe to the wireless node, and transmitting a first parameter indicator identifying the selected set of control channel parameters to the wireless node.

34 Claims, 16 Drawing Sheets

Related U.S. Application Data

(60) Provisional application No. 61/471,055, filed on Apr. 1, 2011, provisional application No. 61/470,940, filed on Apr. 1, 2011, provisional application No. 61/471,049, filed on Apr. 1, 2011, provisional application No. 61/471,061, filed on Apr. 1, 2011.

(56) References Cited

U.S. PATENT DOCUMENTS

| | | | |
|---|---|---|---|
| 8,441,996 B2 | 5/2013 | Kim et al. | |
| 8,538,411 B2 | 9/2013 | Kwon et al. | |
| 9,338,730 B2* | 5/2016 | Sartori | H04W 48/12 |
| 2008/0032632 A1 | 2/2008 | Choi et al. | |
| 2008/0043678 A1 | 2/2008 | Taniguchi | |
| 2008/0239977 A1 | 10/2008 | Xue et al. | |
| 2009/0003274 A1 | 1/2009 | Kwak et al. | |
| 2009/0088148 A1 | 4/2009 | Chung et al. | |
| 2009/0161618 A1 | 6/2009 | Johansson et al. | |
| 2009/0257449 A1* | 10/2009 | Chen | H04L 1/0041 370/470 |
| 2010/0103901 A1 | 4/2010 | Miki et al. | |
| 2010/0111226 A1 | 5/2010 | Ko et al. | |
| 2010/0135273 A1 | 6/2010 | Kim | |
| 2010/0150206 A1* | 6/2010 | Futagi | H04W 72/1226 375/130 |
| 2010/0165847 A1* | 7/2010 | Kamuf | H04L 5/0007 370/241 |
| 2010/0172314 A1* | 7/2010 | Lim | H04L 1/0025 370/329 |
| 2010/0177835 A1 | 7/2010 | Dounaev et al. | |
| 2010/0215011 A1* | 8/2010 | Pan | H04L 5/0064 370/329 |
| 2010/0246518 A1 | 9/2010 | Gheorghiu et al. | |
| 2010/0254268 A1 | 10/2010 | Kim et al. | |
| 2010/0272201 A1* | 10/2010 | Nakao | H04L 5/0023 375/260 |
| 2010/0302983 A1* | 12/2010 | McBeath | H04L 5/0005 370/311 |
| 2010/0303011 A1* | 12/2010 | Pan | H04L 5/0007 370/328 |
| 2010/0317359 A1 | 12/2010 | Suga | |
| 2010/0322135 A1 | 12/2010 | Van Lieshout et al. | |
| 2010/0322154 A1 | 12/2010 | Chen et al. | |
| 2011/0021228 A1 | 1/2011 | Kim et al. | |
| 2011/0044391 A1 | 2/2011 | Ji et al. | |
| 2011/0085506 A1* | 4/2011 | Lee | H04L 5/0023 370/329 |
| 2011/0103295 A1 | 5/2011 | Khandekar et al. | |
| 2011/0116572 A1* | 5/2011 | Lee, II | H04B 7/0691 375/295 |
| 2011/0142000 A1 | 6/2011 | Han et al. | |
| 2011/0142107 A1* | 6/2011 | Pan | H04B 7/0671 375/219 |
| 2011/0158104 A1 | 6/2011 | Frenger et al. | |
| 2011/0243090 A1 | 10/2011 | Grovlen et al. | |
| 2011/0273996 A1 | 11/2011 | Kim et al. | |
| 2011/0299490 A1 | 12/2011 | Nordstrom et al. | |
| 2011/0317615 A1 | 12/2011 | Soong et al. | |
| 2012/0008586 A1* | 1/2012 | Kwon | H04L 5/0053 370/329 |
| 2012/0045014 A1 | 2/2012 | Damnjanovic et al. | |
| 2012/0051319 A1 | 3/2012 | Kwon et al. | |
| 2012/0063401 A1 | 3/2012 | Xue et al. | |
| 2012/0069793 A1 | 3/2012 | Chung et al. | |
| 2012/0082130 A1 | 4/2012 | Xue et al. | |
| 2012/0113889 A1 | 5/2012 | Noh et al. | |
| 2012/0207099 A1* | 8/2012 | Lindh | H04L 5/0039 370/329 |
| 2012/0207126 A1 | 8/2012 | Qu et al. | |
| 2012/0275414 A1* | 11/2012 | Hu | H04B 7/0452 370/329 |
| 2012/0314667 A1 | 12/2012 | Taoka et al. | |
| 2013/0003647 A1 | 1/2013 | Shen et al. | |

FOREIGN PATENT DOCUMENTS

| | | |
|---|---|---|
| CN | 101626625 A | 1/2010 |
| CN | 101682406 A | 3/2010 |
| CN | 101682419 A1 | 3/2010 |
| CN | 101868033 A | 10/2010 |
| CN | 101908955 A | 12/2010 |
| CN | 101932077 A | 12/2010 |
| EP | 1681790 B1 | 5/2007 |
| EP | 2448146 A2 | 5/2012 |
| RU | 2391799 C2 | 6/2010 |
| WO | 2009041779 A1 | 4/2009 |
| WO | 2010058245 A1 | 5/2010 |
| WO | 2010070197 A1 | 6/2010 |
| WO | 2010082877 A1 | 7/2010 |
| WO | WO-2010117225 A2 * | 10/2010 ........... H04L 5/0053 |
| WO | 2010129605 A1 | 11/2010 |
| WO | 2010140748 A1 | 12/2010 |
| WO | 2010145530 A1 | 12/2010 |
| WO | 2010145532 A1 | 12/2010 |
| WO | 2010151086 A2 | 12/2010 |

OTHER PUBLICATIONS

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0, Sep. 2011, 79 pages.

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0, Sep. 2011, 122 pages.

"3rd Generation Partnership Project; Technical Specification Group Radio Access Network; Evolved Universal Terrestrial Radio Access (E-UTRA); Physical layer for relaying operation (Release 10)," 3GPP TS 36.216, V10.1.0, Dec. 2010, 15 pages.

"3rd Generation Partnership Project; Technical Specification Group Radio Access Network; Evolved Universal Terrestrial Radio Access (E-UTRA); Physical layer for relaying operation (Release 10)," 3GPP TS 36.216, V10.3.1, Sep. 2011, 16 pages.

Extended European Search Report, Application No. 12763491.3, dated Apr. 1, 2014, 10 pages.

Communication pursuant to Article 94(3) EPC received in Application No. 12763491.3-1854 dated Jul. 21, 2015, 7 pages.

EP Office Action received in Application No. 12763491.3-1854 dated Feb. 5, 2015, 8 pages.

International Search Report received in Patent Cooperation Treaty Application No. PCT/CN2012/073474, dated Jul. 5, 2012, 3 pages.

Asustek, "PHICH resource allocation in LTE-A," 3GPP TSG RAN WG1 Meeting #60, Decision and Discussion, San Francisco, CA, USA, Feb. 22-26, 2010, 4 pages.

Panasonic, "Capturing of agreements on relaying from RAN1 #64," Change Request received in 3GPP TSG-RAN1 Meeting #64, R1-111217, Taipei, Taiwan, Feb. 21-25, 2011, 12 pages.

Russian Notice of Allowance received in Application No. 2013148797 dated Sep. 1, 2015, 12 pages.

U.S. Office Action of U.S. Appl. No. 13/436,657, dated Dec. 26, 2013, 21 pages.

Written Opinion of the International Searching Authority received in Patent Cooperation Treaty Application No. PCT/CN2012/073474, dated Jul. 5, 2012, 3 pages.

3rd Generation Partnership Project; Technical Specification Group Radio Access Network; Evolved Universal Terrestrial Radio Access

(56) References Cited

OTHER PUBLICATIONS (E-UTRA); Physical layer procedures(Release 10), 3GPP TS 36.213 V10.1.0 (Mar. 2011), Mar. 2011, 115 pages.
3rd Generation Partnership Project; Technical Specification Group Radio Access Network; Evolved Universal Terrestrial Radio Access (E-UTRA); Radio Resource Control (RRC); Protocol specification(Release 9), 3GPP TS 36.331 V9.6.0 (Mar. 2011), 252 pages.

* cited by examiner

SYSTEM AND METHOD FOR TRANSMITTING AND RECEIVING CONTROL CHANNELS

This application is a continuation of U.S. patent application Ser. No. 13/436,590, filed Mar. 30, 2012, entitled "System and Method for Transmitting and Receiving Control Channels," which claims the benefit of U.S. Provisional Application No. 61/471,055, filed on Apr. 1, 2011, entitled "System and Method for Transmission and Reception of Control Channels," U.S. Provisional Application No. 61/470,940, filed on Apr. 1, 2011, entitled "System and Method for Transmission and Reception of Control Channels in a Communications System," U.S. Provisional Application No. 61/471,049, filed on Apr. 1, 2011, entitled "System and Method for Signaling a Location of a Control Channel," and U.S. Provisional Application No. 61/471,061, filed on Apr. 1, 2011, entitled "System and Method for Transmission and Reception of Control Channels," which applications are hereby incorporated herein by reference.

CROSS-REFERENCE TO RELATED APPLICATIONS

This application is related to the following co-assigned patent applications: Ser. No. 13/434,449, filed Mar. 29, 2012, entitled "System and Method for Transmission and Reception of Control Channels in a Communications System"; Ser. No. 13/436,375, filed Mar. 30, 2012, entitled "System and Method for Signaling a Location of a Control Channel"; and Ser. No. 13/436,657, filed Mar. 30, 2012, entitled "System and Method for Transmission and Reception of Control Channels" which applications are hereby incorporated herein by reference.

TECHNICAL FIELD

The present disclosure relates generally to digital communications, and more particularly to a system and method for transmitting and receiving control channels.

BACKGROUND

Wireless telephony systems have traditionally been deployed using the concept of a cell, with one base station (BS) (also known as base transceiver station (BTS), Node B (NB), evolved NB (eNB), Access Point, communications controller, and the like) covering a given geographic area. BSs having the same or similar transmit power are typically used. In addition, in order to maximize coverage and to maintain interference at a reasonable level, careful site planning is used. A network deployed in such a manner is usually referred to as a homogenous network (HomoNet).

While such a deployment is optimal when the user density is uniform, in practice, it has serious shortcomings because the user density and traffic demand are rarely uniform. For example, in rural areas, roads are typically the only area where users are present. In urban or suburban areas, there are locations (hot spots) where the traffic demand is higher: such locations may comprise shopping malls, hotels, conference centers, and the like.

In order to improve coverage and user satisfaction, it may be advantageous to cover these hot spots of traffic demands with Low Power Nodes (LPNs). For instance, lower power base stations can be deployed to, e.g., cover lobbies of hotels, portions of shopping malls, and the like. The coverage of such a base station is referred to as a pico cell. When the base station transmit power is even lower, e.g., to cover a single residential unit, the coverage of such a base station is referred to as a femto cell. A network comprising regular base stations and pico cells and/or femto cells is referred to as a heterogeneous network (HetNet).

HetNets present new challenges to the deployment of a cellular system. In particular, the cellular layout may not be as regular as for a HomoNet since it is dependent on the hot spot locations. In particular, it may well happen that a LPN is located close to another base station. The close proximity can create a high level of interference for both user equipment (UE) (also known as mobile station (MS), terminal, user, subscriber, wireless node, and the like) and BSs.

In the Third Generation Partnership Project (3GPP) Long Term Evolution (LTE) Release-10 technical standards, transmissions from the BS comprise both data channels and control channels. The interference can affect both the data channels and control channels. While solutions exist to mitigate interference on the data channels, no such solution has been defined yet for the control channels.

SUMMARY OF THE DISCLOSURE

Example embodiments of the present disclosure which provide a system and method for transmitting and receiving control channels.

In accordance with an example embodiment of the present disclosure, a method for transmitting first control information to a wireless node in a communications system is provided. The method includes modulating, by a communications controller, the first control information, and mapping, by the communications controller, the modulated first control information onto resources associated with a first wireless node specific search space, the wireless node specific search space being located in a first data region of a first subframe, the first subframe includes a common search space in addition to the wireless node specific search space, wherein at least one of modulating the first control information and mapping the modulated first control information is performed according to a first set of control channel parameters associated with the first wireless node specific search space. The method also includes transmitting, by the communications controller, the first subframe to the wireless node.

In accordance with another example embodiment of the present disclosure, a method for receiving first control information at a wireless node in a communications system is provided. The method includes searching for a first control channel in resources associated with a first wireless node specific search space located in data region of a first subframe, the first subframe including a common search space in addition to the first wireless node specific search space, wherein the first control channel is modulated and mapped according to a first set of control channel parameters associated with the first control channel. The method also includes decoding the first control channel to produce the first control information.

In accordance with another example embodiment of the present disclosure, a communications controller is provided. The communications controller includes a processor, and a transmitter operatively coupled to the processor. The processor modulates first control information, and maps the modulated first control information onto resources associated with a first wireless node specific search space, the wireless node specific search space being located in a first data region of a first subframe, the first subframe includes a common search space in addition to the wireless node specific search space, wherein at least one of the modulate the first control information and the map the modulated first control information is according to a first set of control channel parameters associated with the first wireless node specific search space. The transmitter transmits the first subframe to a wireless node.

In accordance with another example embodiment of the present disclosure, a wireless node is provided. The wireless node includes a processor. The processor searches for a first control channel in resources associated with a first wireless node specific search space located in data region of a first subframe, the first subframe including a common search space in addition to the first wireless node specific search space, wherein the first control channel is modulated and mapped according to a first set of control channel parameters associated with the first control channel, and decodes the first control channel to produce first control information.

One advantage of an embodiment is that advanced transmission parameters are used for control channels to help improve reliable delivery as well as increased efficiency.

A further advantage of an embodiment is that low overhead techniques are used to minimize the impact of signaling overhead in using the advanced transmission parameters on the overall performance of the communications system.

BRIEF DESCRIPTION OF THE DRAWINGS

For a more complete understanding of the present disclosure, and the advantages thereof, reference is now made to the following descriptions taken in conjunction with the accompanying drawing, in which:

FIGS. 3a through 3e illustrate example locations for a second control region in a data region according to example embodiments described herein;

DETAILED DESCRIPTION OF ILLUSTRATIVE EMBODIMENTS

Figure 1:
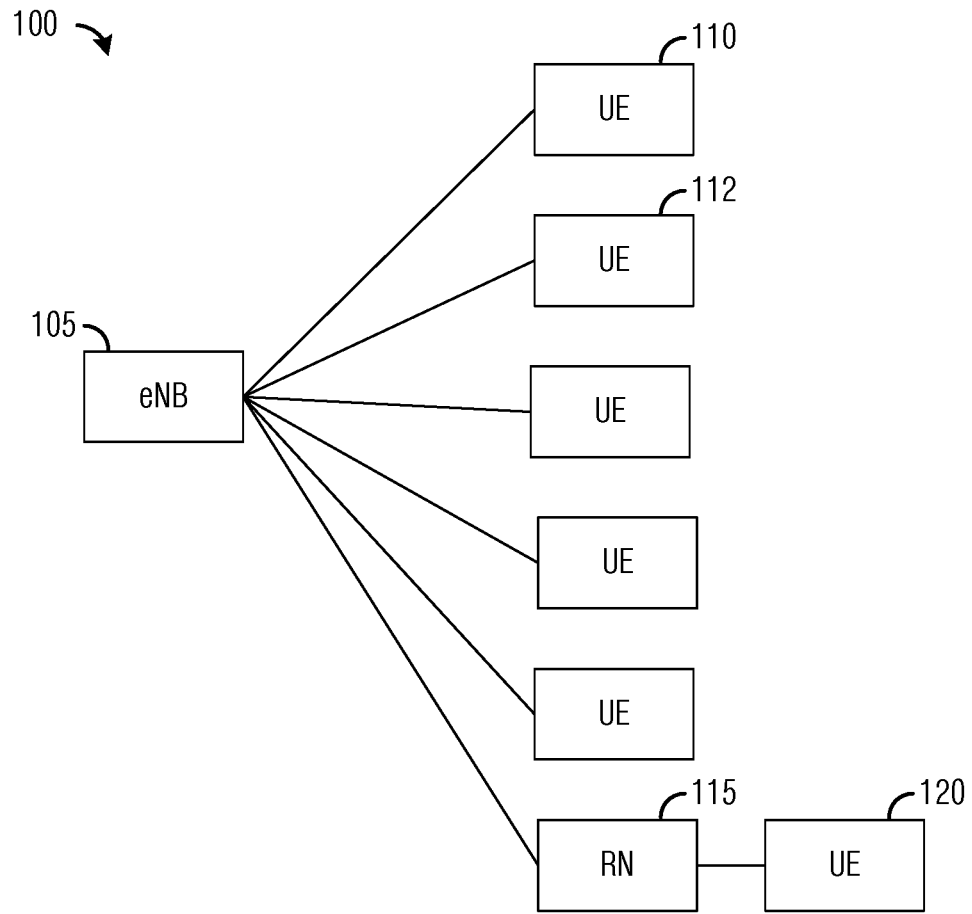
FIG. 1 illustrates an example communications system according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to transmission and reception of control channels in a communications system. For example, an eNB modulates control information to be transmitted to a wireless node, and then maps the modulated control information onto a wireless node specific search space of a subframe. The eNB performs the modulating and/or the mapping according to control channel parameters of a control channel used to transmit the control information.

The present disclosure will be described with respect to example embodiments in a specific context, namely a HetNet deployment including a 3GPP LTE compliant communications system. The disclosure may also be applied, however, to other HetNet deployments, such as those including 3GPP LTE-Advanced, WiMAX, and the like, compliant communications systems, as well as HetNet deployments with non-standards compliant communications systems.

For 3GPP LTE Release 10 (Release-10) and earlier technical standards, both a Physical Downlink Control Channel (PDCCH) and a Physical Downlink Shared Channel (PDSCH) are defined. The PDSCH may be used to carry data information. The PDCCH may convey control information about a particular PDSCH, such as resource allocation information, modulation and coding information, and information about a Physical Uplink Shared Channel (PUSCH). The PDCCH may be considered to be a first type of control channel. For brevity, the control information for PDSCH and PUSCH can be referred as resource allocation information.

The PDCCH may be located in the first several symbols (e.g., one to four symbols) of a subframe. These PDCCH-bearing symbols may be referred to as a control domain or a control region. Other symbols in the subframe may be used for data transmission, and may be referred to herein as a data domain or a data region. Hence the PDCCH is located in control region while the PDSCH is located in data region.

In the control region, there may be other control channels, such as a Physical Hybrid Indicator Channel (PHICH), which is used to transmit ACK/NACK in response to uplink data transmission, and the Physical Control Format Indicator Channel (PCFICH), which is used to indicate the number of symbols of a control region in a subframe.

In 3GPP LTE Release-11 (LTE-A) or beyond technical standards, an eNB locates a new type of control channel(s), which may be located in the data region, control region, or both of a subframe may be considered. More specifically, when the control channel is located in the data region, a second control region may be defined and uses a portion of the data region. The second control region comprising some combination of time and frequency resources, e.g., resource elements, with a group of resource elements forming a resource block (RB). For example, in one 3GPP LTE configuration, 84 resource elements make up a RB. Similarly, a group of resource elements forms a control channel element. For example, in one 3GPP LTE configuration, 36 resource elements make up a control channel element. At least part of the time and frequency resources (or simply, resources) of the second control region may be used for transmitting control information in the new type of control channel, e.g., a second type of control channel. The resources of the second control region that are not used for transmitting control information may be used for other purposes, such as transmitting data, e.g., on the PDSCH.

One or more resource elements or parts of resource blocks (RBs) from the data region may be allocated for the second control region. As an example, a new second type control channel, a UE Physical Downlink Control Channel (U-PD-CCH), may be located in the second control region of the data region (or the control region or both the data region and the control region), and may carry control information for a PDSCH or control information for a PUSCH. The second channel may carry resource assignments for UEs or other network nodes such as relay nodes. Additionally, the second control region may carry channels analogous to those carried in the first control region, such as the physical hybrid automatic repeat requested indicator channel (PHICH), and the like. A prefix of "U-" may be added to indicate the analogous channel in the second control region, such as the "U-PHICH". Collectively, information carried in these control channels, such as resource assignments (also commonly referred to as resource allocation assignments), configuration information, power control, codebook information, hybrid automatic repeat requested (HARD) information, and the like, may be referred to as control information. The format and content of these analogous channels may be different from the first control region.

In addition to the first type of control channel and the second type of control channel, there may be other control channel types, including a third type of control channel, which may be transmitted in both the first control region and in the second control region. The information in the two control regions may be the same or it may be different.

FIG. 1 illustrates a communications system 100. Communications system 100 includes an evolved NodeB (eNB) 105, which may also be commonly referred to as a controller, a communications controller, a base station, a NodeB, and the like. Communications system 100 also includes a plurality of User Equipment (UE), such as UE 110, 112, and 120. A UE may also be commonly referred to as a mobile, mobile station, subscriber, user, terminal, wireless node, and the like. In addition, the communication system may include other entities such as Relay Node (RN) 115. The RN may serve one or more UEs, such as UE 120.

Communications between eNB 105 and a given UE may occur over a link that comprises a Un downlink (DL) channel and an Un uplink (UL) channel. UEs not directly served by the RN and RNs may be multiplexed together using and may be allocated different RBs. For 3GPP LTE Release-10, the UE resource assignments are transmitted on the PDCCH.

While it is understood that communications systems may employ multiple eNBs capable of communicating with a number of UEs, only one eNB, a plurality of UEs, and one RN are illustrated for simplicity.

Figure 2A:
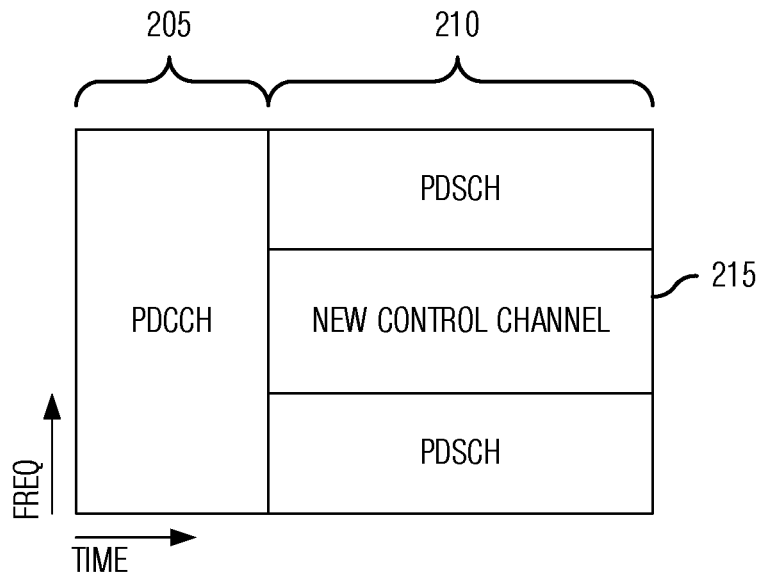
FIGS. 2a through 2d illustrate example subframes according to example embodiments described herein.

FIG. 2a illustrates a first subframe 200. Subframe 200 comprises a first control region 205 and a data region 210. Subframe 200 shows an example for a multicarrier modulation system. As discussed above, first control region 205 may include control signaling, such as a PDCCH, while data region 210 may include data as well as control signaling, which may include a PDSCH, as well as new control channels, such as a U-PHICH or a U-PDCCH.

First control region 205 may also be called a PDCCH control region and may contain the first type of control channels. The new control channels (e.g., the second type of control channels) are located in a new control region 215 (also commonly referred to as a second control region 215), which may be inside data region 210. New control region 215 can also be called the U-PDCCH control region. Although data region 210 may be used to transmit data, no data is shown in FIG. 2a. As shown in FIG. 2a, second control region 215 is located in data region 210, while PDCCH is located in first control region 205.

The representation of the various channels and regions in FIG. 2a is logical in nature with no direct relationship to an actual mapping of specific physical resources. In particular, the resources comprising second control region 215 may be distributed in frequency and are not restricted to be contiguous in frequency. Second control region 215 may also be time multiplexed with data, and for instance, may occupy only the first or the second slot of a subframe. In addition, second control region 215 may not necessarily start immediately after first control region 205, but may be offset by one or more symbols. Second control region 215 may consist of Physical RBs (PRBs) or Virtual RBs (VRBs), either localized or distributed. The PRBs and the VRBs comprise a plurality of resource elements.

Figure 2B:
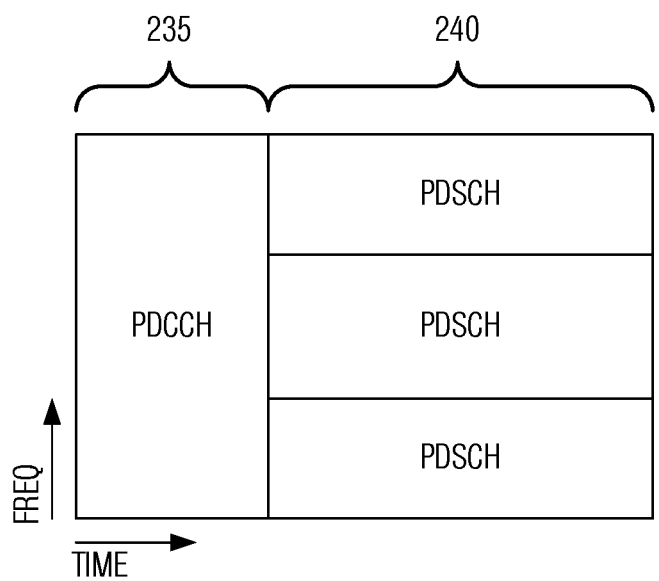

FIG. 2b illustrates a second subframe 230. Subframe 230 comprises a first control region 235 and a data region 240.

As discussed above, first control region 235 may include control signaling, such as a PDCCH, while data region 240 may include data without control signaling. First control region 235 may also be called a PDCCH control region.

Figure 2C:
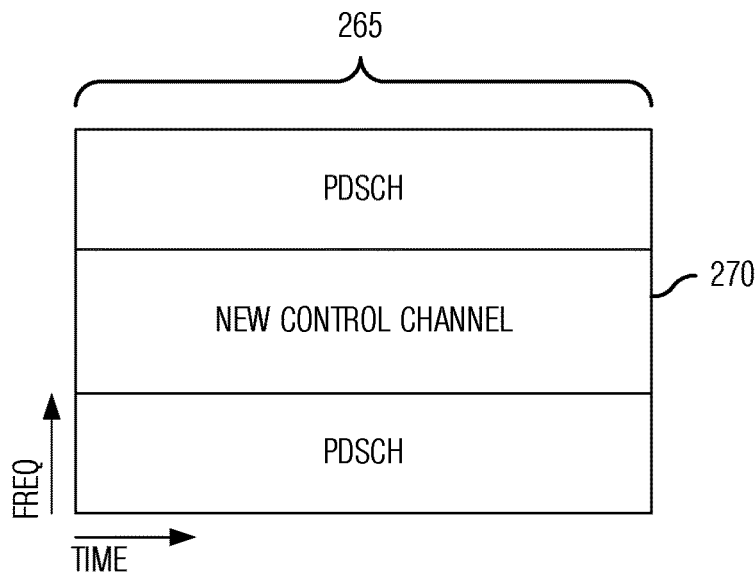

FIG. 2c illustrates a third subframe 260. Subframe 260 comprises a data region 265. As discussed above, data region 265 may include data as well as control signaling, which may include a PDSCH, as well as new control channels, such as a U-PDCCH or a U-PHICH. The new control channels are located in a new control region 270, which may be inside data region 265. New control region 270 may be used to transmit data, but no data is shown in FIG. 2c. As shown in FIG. 2c, new control region 270 is located in data region 265. It is noted that subframe 260 has no PDCCH since a first control region is absent.

Figure 2D:
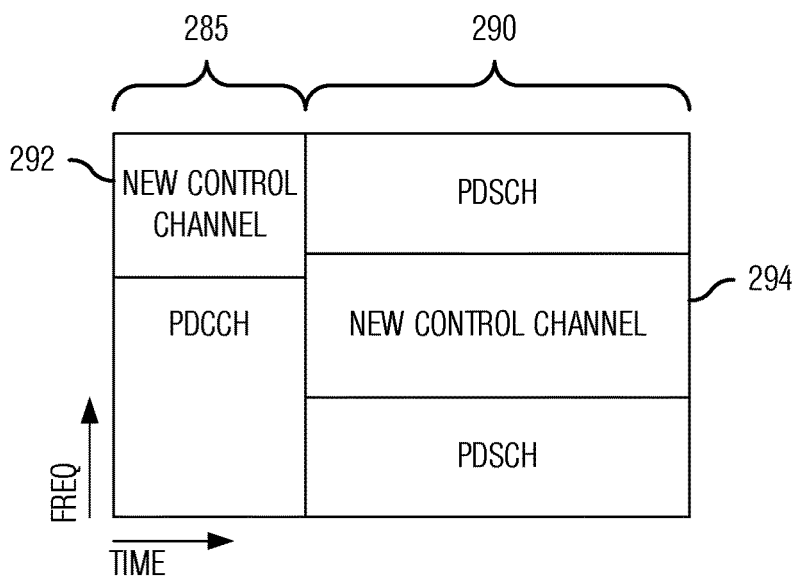

FIG. 2d illustrates a fourth subframe 280. Subframe 280 comprises a control region 285 and a data region 290. As discussed above, control region 285 may include control signaling, while data region 290 may include data as well as control signaling. The new control channel may be located in a first new control region 292, which may be inside control region 285, as well as in a second new control region 294, which may be inside data region 290.

In 3GPP LTE Release-10 and previous releases, a search space may be used to define possible locations for a PDCCH within the PDCCH control region. The PDCCH control region comprises one or more control channel elements (CCEs). There is a mapping procedure for assigning the resource elements that comprise each CCE to a both time location and frequency location, i.e., resources, within the PDCCH control region. A particular PDCCH may occupy 1, 2, 4, or 8 consecutive CCEs. A UE may use search space rules to identify possible CCEs that contain control information, such as, resource assignments (i.e., a PDCCH), for it. The search space rules may also have provisions for a common search space.

FIG. 3a illustrates a diagram of possible locations for a second control region in a data region 310 of a subframe. Also shown in FIG. 3a is a first control region 305. Data region 310 comprises one or more RBs (each of which comprises a plurality of resource elements or a plurality of control channel elements) in the first slot (RBs 330, 331, 332, 333, and 334) and one or more RBs in the second slot (RBs 335, 336, 337, 338, and 339). In FIG. 3a, examples of adjacent RBs in the first slot are 330 and 331, 331 and 332, and the like. Similarly, examples of adjacent RBs in the second slot are 336 and 337, 338 and 339, and the like.

FIG. 3b illustrates an example U-PDCCH control region within data region 310 of a subframe, with the U-PDCCH control region occupying adjacent RBs. As shown in FIG. 3b, the U-PDCCH control region may occupy adjacent RBs, such as 331, 332, 333, 336, 337, and 338 for U-PDCCH 320. FIG. 3c illustrates an example U-PDCCH control region with data region 310 of a subframe, with the U-PDCCH control region occupying distributed VRBs. As shown in FIG. 3c, the U-PDCCH control region may occupy distributed VRBs using 330, 332, 334, 335, 337, and 339 for U-PDCCH 321.

Figure 3E:
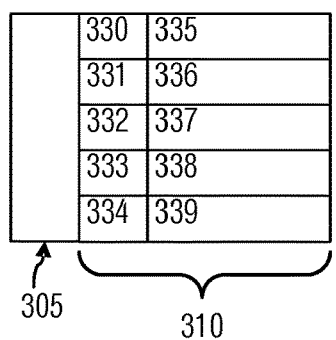
Figure 3E:
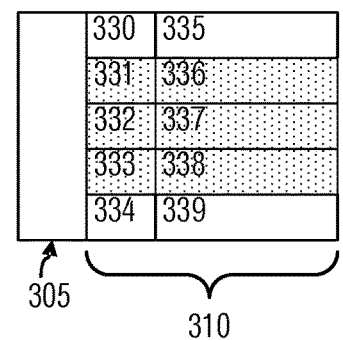
Figure 3E:
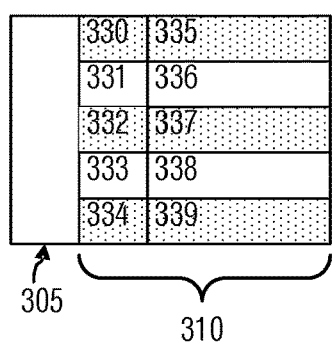
Figure 3E:
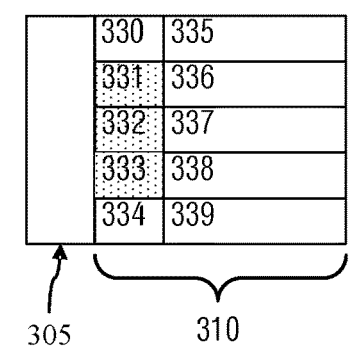
Figure 3E:
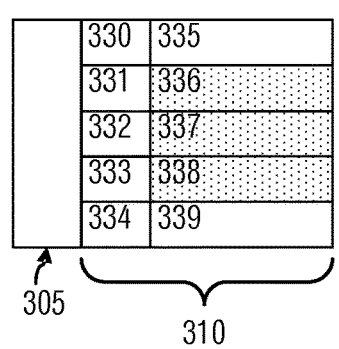

FIG. 3d illustrates an example U-PDCCH control region within data region 310 of a subframe, with the U-PDCCH control region occupying first slot RBs. As shown in FIG. 3d, the U-PDCCH control region may occupy the first slot using RBs 331, 332, and 333 for U-PDCCH 322. FIG. 3e illustrates an example U-PDCCH control region within data region 310 of a subframe, with the U-PDCCH control region occupying second slot RBs. As shown in FIG. 3e, the U-PDCCH control region may occupy the second slot using 336, 337, and 338 for U-PDCCH 323. It is also noted that the U-PDCCH control region may occupy RBs that are combinations of those illustrated herein. It is noted that although first control regions are shown in FIGS. 3a through 3e, in some subframes, the first control region may be absent.

In a communications system with relay nodes, a R-PDCCH may be used to transmit control signaling for notifying RNs of the DL and/or UL grants on the Un link (the link between the eNB and the RN). However, the R-PDCCH may have limitations if it were used for UEs. The R-PDCCH may be used as a basis for designing a new control channel (herein referred to as a U-PDCCH) to allow UEs to be notified of their UL and/or DL grants.

There are some benefits of having a U-PDCCH and/or a U-PHICH. The U-PDCCH and the U-PHICH, as well as other control channels located in the data region (i.e., the second control region), may be referred to as data region control channels. For example, different cells may allocate orthogonal time-frequency resource (different second control regions) for the U-PDCCH and/or U-PHICH, thus the interference between U-PDCCH and/or U-PHICHs of different cells is significantly lowered. Another benefit may be that a dedicated reference signal can be used for the second control region, in other words, second control region has its own reference signal for channel estimation during demodulation, thereby allowing more advanced transmission schemes, such as beam forming or precoding.

There are some benefits of having a PDCCH and a U-PDCCH and/or a U-PHICH. The PDCCH may be detectable by legacy UEs, which would not be able to detect the U-PDCCH and/or a U-PHICH. Furthermore, the ability to distribute some of control information to the U-PDCCH and/or the U-PHICH may enable the eNB to perform load balancing on the different control channels. Additionally, if the transmission of control information on a particular control region (e.g., the first control region or the second control region (i.e., the data region)) is failing, it may be possible to use a different control region to potentially achieve better transmission performance.

Several properties make the U-PDCCH control region (the second control region or the data region) an attractive solution to mitigate the effects of interference on the DL:

1. A U-PDCCH control region may occupy a subset of frequency resources, thereby providing orthogonality for control channels in frequency domain from different HetNet layers unlike other time division multiplex (TDM) HetNet solutions (e.g., almost blank subframe (ABS)) which may provide orthogonality in time domain;

2. A U-PDCCH control region does not disrupt or conflict with the current physical data control channel (i.e., a PDCCH), so prior release UEs (i.e., legacy UEs) are not impacted and are without a reduction in peak data rate if the resource allocation of the U-PDCCH control region can be released dynamically which may be a problem with other frequency division multiplex (FDM) HetNet solutions;

3. With a U-PDCCH control region, it may be possible to reduce the number of symbols used for a PDCCH control region, thus to improve the overall capacity (e.g., the time granularity is 1/14th in time with a normal cyclic prefix (CP), but can be much lower in frequency, e.g., 1/50th for a 10 MHz deployment); and 4. It may be possible to use a Demodulation Reference Signal (DMRS) on the U-PDCCH control region. The use of the DMRS could create a more efficient control channel that may take advantage of technologies such as dynamic link adaptation, frequency selective resource allocation, and Multiple Input, Multiple Output (MIMO) transmission. Some of these improvements can be done for the PDCCH (e.g., link adaptation), but, for example, Multi-User MIMO (MU-MIMO) is better suited for the U-PDCCH.

Comparing to a backhaul link between a Donor eNB (DeNB) and the Relay Node (RN), there may be some unique properties of the access link between the eNB and the UE and hence some issues that should be considered:

a) A UE is generally mobile while a RN is typically stationary. This implies that fast link adaptation is more beneficial and desirable, and at the same time more difficult. A difficulty is due to the lack of another control channel to inform the transmission format of U-PDCCH as in the case of PDSCH. Another related issue is that due to mobility of the UE, the re-transmission rate for PDSCH of a UE tends to be higher than that of a RN;

b) A UE may read a PDCCH while a RN cannot. Therefore, PDCCH and U-PDCCH may co-exist for a UE and designs are needed to cope with and take advantage of the co-existence;

c) Since the number of UEs associated with a cell is typically be much larger than the number of RNs, a more efficient design of the U-PDCCH may be required to reduce overhead and ensure high performance;

d) Because the location of a RN can be carefully selected, it generally sees better channel quality compared to a UE. Therefore, there is a higher requirement for interference management for the UE, especially for the control channel; and e) No switching time is needed for a UE as in the case of RN.

The following is a discussion of exemplary scenarios illustrating the attractiveness of a U-PDCCH.

Scenario 1: HetNet Deployment

A HetNet deployment typically has an aggressor layer and a victim layer. At a given location in a deployment, the power received from an aggressor layer may be much greater than the power received from the victim layer. As an example, in a first deployment, a macro layer may be considered an aggressor to a victim pico layer. Alternatively, in a second deployment, a femto layer may be considered an aggressor to a victim macro layer. Taking as an example the macro-pico HetNet deployment scenario as described above, the macro cell layer may use the regular PDCCH as specified in 3GPP LTE Release-10. Data for macro-UEs, which are UEs assigned to a macro cell layer, can be scheduled anywhere in the data region. For example, to mitigate interference, power control can be applied on the downlink control channels so that low-power transmissions can be used for macro UEs. As a result, the macro cell layer can have a PDCCH for each subframe while the pico cell layers can use either PDCCH or U-PDCCH. It is noted that this is just one of many possible scenarios. For other scenarios, it can be beneficial for the macro layer to have a U-PDCCH as well.

Scenario 1a: Fixed Assignment of U-PDCCH to UEs

Figure 3F:
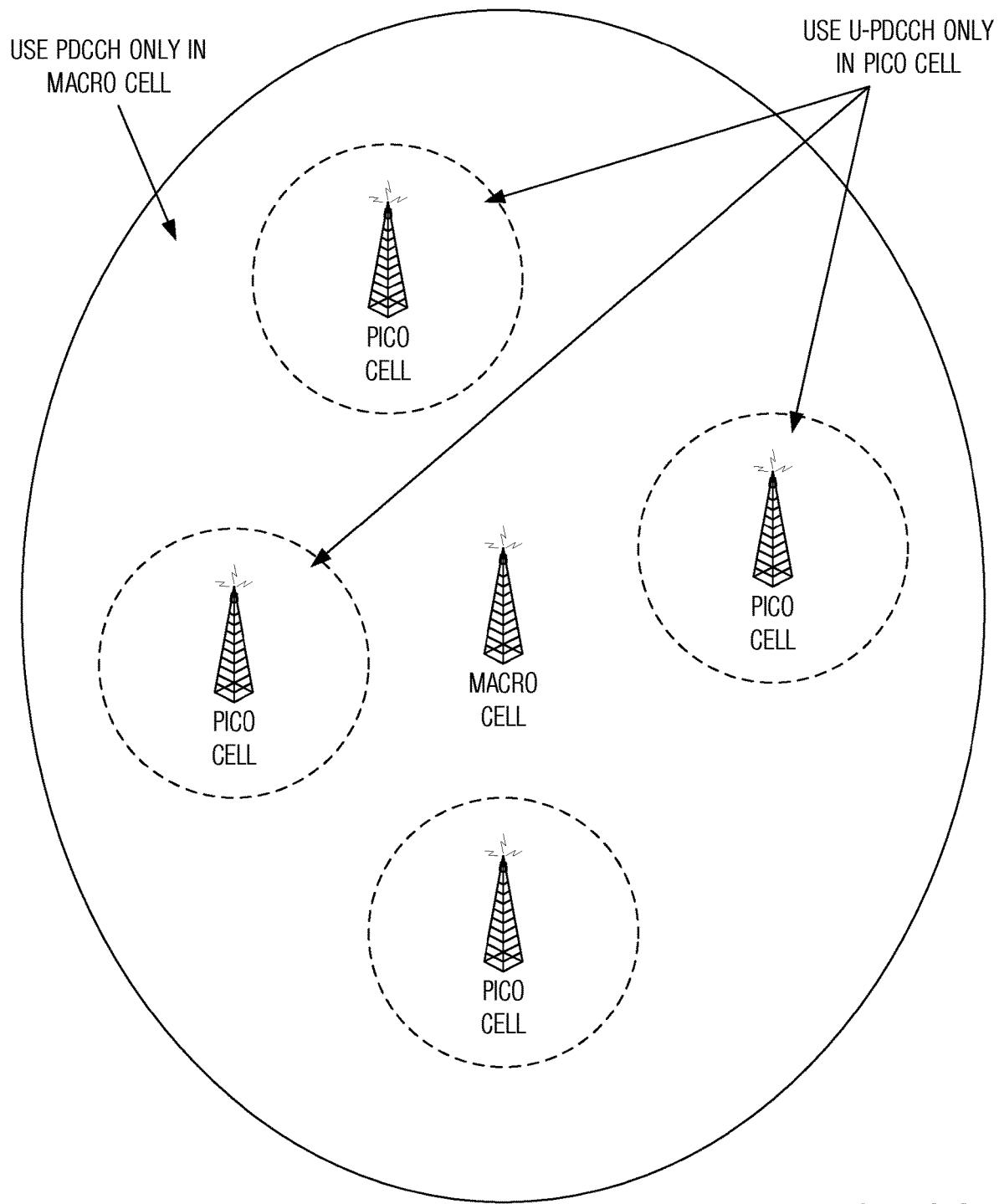
FIG. 3f illustrates an example HetNet communications system configured with fixed assignment of U-PDCCH to UEs according to example embodiments described herein.

In scenario 1a, pico-UEs, i.e., UEs assigned to a pico cell layer, are assigned one control channel only. Some UEs receive their assignments on the U-PDCCH only while other UEs receive their assignment on the regular PDCCH. The latter case may be needed for legacy UEs, for example. The pico eNB needs to transmit at least a common reference signal (CRS) on the PDCCH, with possibly more information, similar to Almost Blank Subframes (ABS). It is noted that the U-PDCCH may be interfered with by a reference signal (RS) sent by the macro cell. Muting and/or puncturing may be needed to mitigate the interference. FIG. 3*f* illustrates a HetNet communications system configured with a fixed assignment of U-PDCCH to UEs.

Scenario 1b: Flexible Assignment of U-PDCCH to UEs

Figure 3G:
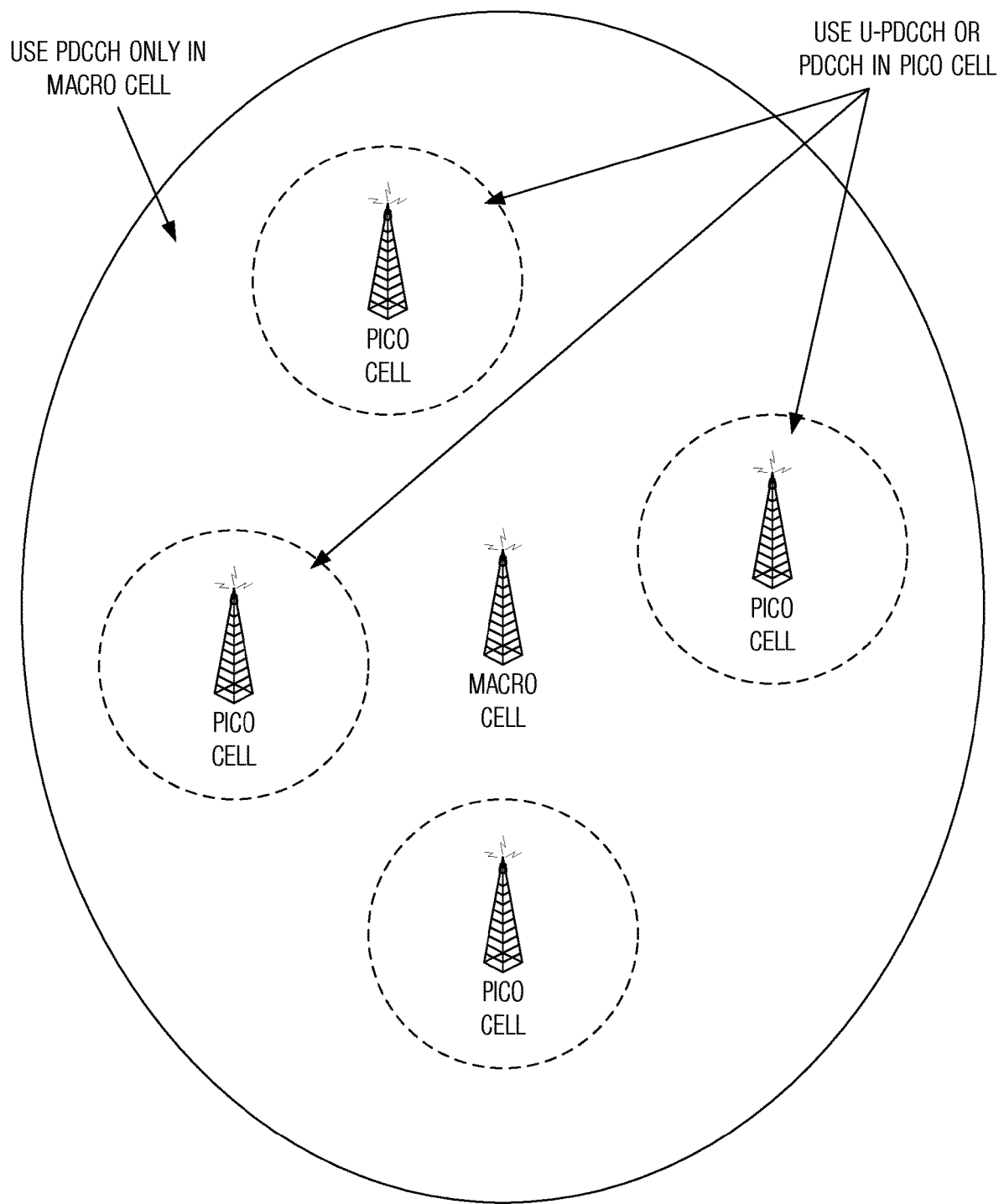
FIG. 3g illustrates an example HetNet communications system configured with flexible assignment of U-PDCCH to UEs according to example embodiments described herein.

In scenario 1b, the pico UEs may receive assignments either on the PDCCH or the U-PDCCH. For instance, pico UEs severely interfered by the macro cell's PDCCH may switch to the U-PDCCH while UEs having a manageable level of interference (e.g., UEs close to the pico cell) may continue to use the PDCCH. It is noted that the dynamic switching mechanism may also be useful to perform load balancing on the control channel region, for example. FIG. 3*g* illustrates a HetNet communications system configured with flexible assignment of U-PDCCH to UEs.

Scenario 2: CoMP Deployment

In scenario 2, the U-PDCCH may be used to avoid a potentially high level of interference between the PDCCH from two cells. A PDCCH in a first cell and a U-PDCCH in a second cell may be made orthogonal to help reduce interference. Orthogonalization is discussed in greater detail below. As in scenarios 1a and 1b discussed previously, fixed assignment and flexible assignment of the U-PDCCH may be used.

Advanced transmission schemes may be used for the U-PDCCH in order to achieve better performance as well as higher efficiency and capacity. As an example, the U-PDCCH may support transmissions of spatial multiplexing with number of layers greater than one, allow multiple U-PDCCHs of one or more UEs to be transmitted at the same resource, and support more dynamic link adaptation or adaptive modulation/coding (AMC).

In order to support these transmission schemes, as well as others, when the UE decodes the U-PDCCH, it may be aware of the following information (which may be referred to hereinafter as control channel parameters) regarding the U-PDCCH transmission(s):

The modulation scheme (MS), such as QPSK, 16-QAM, or 64-QAM, for example.

The coding rate (CR) and/or the aggregation level (the amount resources) used for transmission.

The number of layers of the transmission when spatial multiplexing is used for U-PDCCH transmission. The number of layers may also be known as the rank of the transmission and may be referred to as a rank indication (RI). The rank of a U-PDCCH transmission may be the number of MIMO layers, also known as independent spatial streams, in which the U-PDCCH modulation symbols are mapped onto.

The antenna port(s) (AP) of the transmission, which may be in the form of a number of antenna ports used, and/or an antenna port number. When multiple U-PDCCH transmissions use the same resource, the signals of the multiple U-PDCCHs may be sufficiently separated at the receiver by taking advantage of multiple transmit antennas at the eNB. This technique may also be referred to as Multi-User (MU) MIMO (MU-MIMO) where multiple signals for different users sharing the same resource are separated in spatial domain by applying different transmission precoders. In general, the transmission precoder is a set of weighting factors applied to multiple transmission antennas. Each U-PDCCH may be transmitted on a different set of antenna ports associated with a demodulation reference signal and/or symbol (DMRS, also commonly referred to as a UE-specific RS). The DMRS antenna port may be considered as a virtual antenna where the transmission precoder is applied at a per-UE or per-channel basis.

These parameters can be used to improve the performance of the U-PDCCH over that of the PDCCH and/or the R-PDCCH. These parameters may also be used to improve the performance of the PDCCH and/or the R-PDCCH. The signaling of the parameters (i.e., the control channel parameters) of U-PDCCH transmissions utilizing these advanced transmission techniques to the targeted UE is needed.

A simple solution may be to signal at least some of the control channel parameters using higher layer signaling, for example, radio resource control (RRC) signaling. In such a scenario, the control channel parameters may be semi-statically configured and typically are not updated or changed very frequently. Therefore, the higher layer signaling solution may be attractive for low-mobility users where fast adaptation of transmission format or scheme is not necessary. It could also be a valuable improvement for use with signaling control channel parameters of other control channels, such as the R-PDCCH, since the 3GPP LTE Release-10 compliant relays are stationary.

Figure 4A:
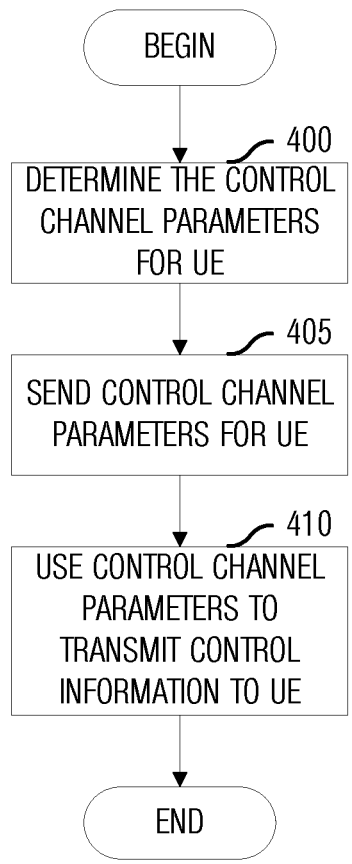
FIG. 4a illustrates an example flow diagram of eNB operations in transmitting control information, wherein the eNB makes use of control channel parameters associated with a control channel in transmitting the control information according to example embodiments described herein.

FIG. 4a illustrates a flow diagram of eNB operations in transmitting control information, wherein the eNB makes use of control channel parameters associated with a control channel in transmitting the control information. eNB operations may be indicative of operations occurring at an eNB, such as eNB 105, as the eNB transmits control information using control channel parameters associated with a control channel.

eNB operations may begin with the eNB determining the control channel parameters for the control channel, such as the U-PDCCH, of a given UE (block 400). As an example, the control channel parameters for the U-PDCCH may include modulation scheme, coding rate, aggregation level, rank indicator (number of transmission layers), antenna port number, number of antenna ports, and the like. The eNB may determine the control channel parameters according to factors such as UE capability, channel condition, communications system condition, available resources, required or requested resources, and the like. The eNB may send the control channel parameters for the U-PDCCH to the UE by higher layer signaling or a control channel (block 405). The eNB may start using the control channel parameters for the U-PDCCH when transmitting control information to the UE (block 410).

Figure 4B:
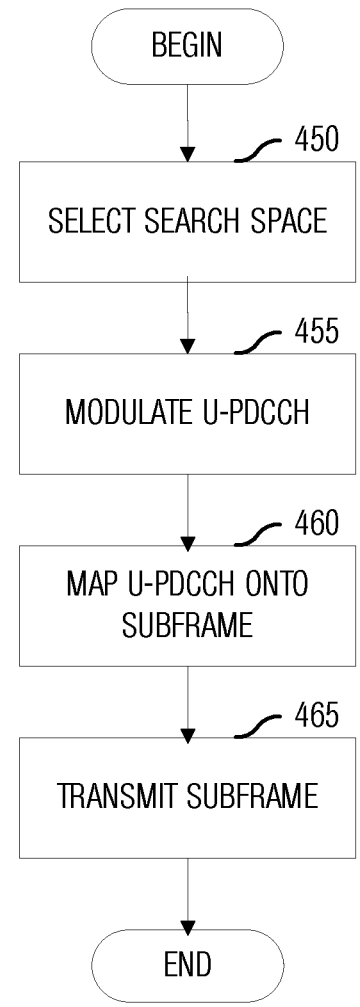
FIG. 4b illustrates an example flow diagram of eNB operations in using control channel parameters to transmit a control channel to a UE according to example embodiments described herein.

FIG. 4b illustrates a flow diagram of eNB operations in using control channel parameters to transmit a control channel to a UE. eNB operations may be indicative of operations occurring in an eNB, such as eNB 105, as the eNB transmits a control channel to a UE using control channel parameters selected for the control channel.

eNB operations may begin with the eNB selecting a search space for the control channel (block 450). In general, the eNB may select either a common search space or a UE specific search space for the control channel. As their names imply, the common search space may be used to send control channels to different UEs, while the UE specific search space may be used to send control channels to a specific UE. The UE specific search space may be located in a data region of a subframe, while the common search space may be located in either a control region of the subframe or the data region of the subframe.

The eNB may prepare the control channel for transmission according to the control channel parameters, which may include modulating scheme, coding rate, aggregation level, rank indicator (number of transmission layers), number of antenna ports, antenna port number, and the like. Preparing the control channel for transmission may include coding information in the control channel and modulating the control channel using a modulating scheme (block 455). As an example, modulating the control channel may include modulating the information into QPSK, 16-QAM, 64-QAM, and the like, space. Preparing the control channel for transmission may also include mapping the modulated control channel onto resources, e.g., REs, RBs, and the like, of a subframe (block 460). As an example, the mapping of the control channel onto the subframe may include the control channel being mapped onto resources in the subframe, with the location of the resources in the subframe being dependent on the control channel being mapped. If the control channel being mapped is a U-PDCCH, then the resources may be located in a data region of the subframe, while if the control channel being mapped is a PDCCH, then the resources may be located in a control region of the subframe. The eNB may transmit the subframe (block 465).

Figure 5:
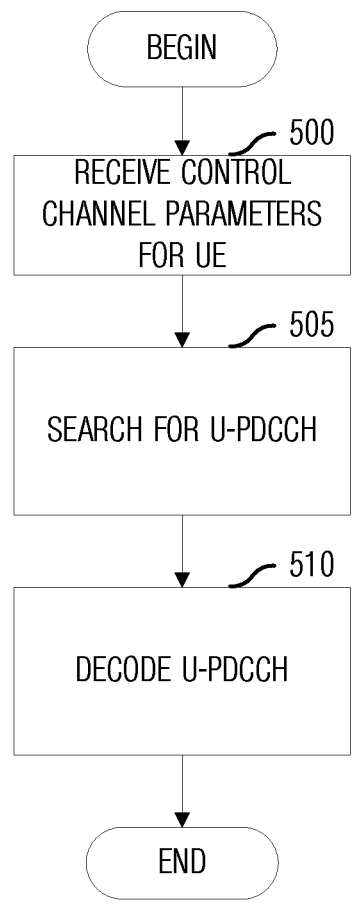
FIG. 5 illustrates an example flow diagram of UE operations in receiving a control channel, e.g., a U-PDCCH, wherein the control channel is generated using control channel parameters according to example embodiments described herein.

FIG. 5 illustrates a flow diagram of UE operations in receiving a control channel, e.g., a U-PDCCH, wherein the control channel is generated using control channel parameters. UE operations may be indicative of operations occurring in a UE, such as UE 110 and UE 120, as the UE receives a control channel, e.g., a U-PDCCH, wherein the control channel is generated using control channel parameters.

UE operations may begin with the UE receiving, by higher layer signaling or a different control channel, control channel parameters for the control channel, e.g., the U-PDCCH (block 500). As an example, the control channel parameters for the control channel, e.g., the U-PDCCH, may include modulation scheme, coding rate, aggregation level, rank indicator (number of transmission layers), antenna port number, number of antenna ports, and the like. The control channel may have been generated, e.g., modulated and/or mapped according to the control channel parameters. The UE may search for the U-PDCCH (block 505). As an example, the control channel that the UE is search for may be modulated and mapped using the control channel parameters. As an illustrative example, the modulation scheme, the coding rate and/or the aggregation level, the rank indicator, the antenna port number or the number of antenna ports, and the like, control channel parameters may be used by the UE when it is searching for the U-PDCCH. The UE may decode the U-PDCCH to retrieve the information carried in the control channel (block 510).

In order to limit the overhead, the eNB may send new control channel parameters when a change in control channel parameters is needed, desired, or requested. If the UE does not receive any new control channel parameters, the UE may assume that old control channel parameters are still valid. The eNB may send the control channel parameters that have changed. When receiving new control channel parameters, the UE may send an acknowledgement (ACK), and the application of the new control channel parameters may start only after the eNB has received the ACK. If RRC signaling is employed, there might be a time ambiguity until the ACK is correctly processed by the eNB. As an example, in order to avoid the time ambiguity, for a limited period of time (which may comprise from when the eNB sent the new control channel parameters until when the ACK is correctly processed by the eNB), the eNB may send the U-PDCCH twice in the same subframe: once with the old control channel parameters and once with the new control channel parameters. As an alternative example, a time stamp to indicate when to apply the new control channel parameters may be included in the higher layer signaling message to the UE. The eNB and the UE may then continue to use the old control channel parameters until the time stamp becomes valid.

In a simple scenario, the RRC signaling message or control channel may include all the information for UE to find and decode its U-PDCCH including the time and frequency resource used, the transmission format, and so on. Therefore, the use of the RRC signaling message may completely eliminate the need for performing blind detection at the UE.

Information that the RRC signaling or the control channel may signal include: MS, CR, RI, and AP. It is noted that not all this information needs to be signaled. As an example, the coding rate may be blindly detected, just as it is done now for the PDCCH and R-PDCCH control channels where the UE may test (blindly detect) different aggregation levels, corresponding to different CR.

Another solution may be to use no signaling at all, and rely on blind decoding by the UE. As an example, the principle used for PDCCH searching in 3GPP LTE Release-8, where the UE examines all the possible combinations of transmission formats for the potential resource allocation within its UE-specific search space and the common search space.

However, for the more general case where there may be a large number of control channel parameters and each control channel parameter may have multiple values, the number of blind decodes can be extremely high. For instance, with just three possible MS values, four possible CR values, and two possible RI values, the number of blind decodes performed by the UE increases by a factor of 24. However, some restrictions on the control channel parameters may be enforced in order to keep the number of blind decodes to a reasonable number. As an example, only a subset of combinations of MS, CR and/or aggregation level, RI, AP, and so forth, may be allowed. For example, higher order modulation scheme (16 Quadrature Amplitude Modulation (16-QAM) or 64-QAM) or rank greater than 1 transmission may not be supported with higher aggregation level, for example, with 2, 4 and 8 Control Channel Elements (CCEs). A general rule used in determining permissible combinations of MS, CR and/or aggregation level, and RI may be that the resulting coding rate is not substantially smaller than the mother code rate of the coding scheme used. As an example, the mother code rate for the coding scheme in 3GPP LTE is $1/3$. As another example, a requirement that MU-MIMO type of transmissions may not be supported with high aggregation level may be used to help keep the number of blind decodes to a reasonable number.

As another example, new combinations of MS, CRs, RIs, APs, and the like, may be applied to the UE-specific search space only or applied to a subset of the candidates within the UE-specific search space. The common search space structure may be the same as for the 3GPP LTE Release-8 PDCCH (with the necessary changes for a frequency-domain implementation, if there is a U-PDCCH common search space). Therefore, the set of candidates S may be indexed from 1 to N. The indexing may be based on the order of which the candidates appear when a hashing function is used (as an example, the 3GPP LTE Release-8 hashing function used for the PDCCH may be used). The entire set of candidates S may be split into a number of subsets, such as two subsets, S1 and S2, with subsets S1 and S2 known by both the eNB and the UE. As an example, the UE may know the subsets S1 and S2 by hardware encoding in the memory of the UE, communication of the subsets when the UE enters the network or the cell, RRC signaling, and the like. On subset S1, the same rules as for 3GPP LTE Release-10 UE may be applied (e.g., use of QPSK only, rank-one transmission), while on subset S2, new control channel parameters, such as higher modulation order, code rate, aggregation level, higher rank, antenna ports, and the like, may be used.

Figure 6:
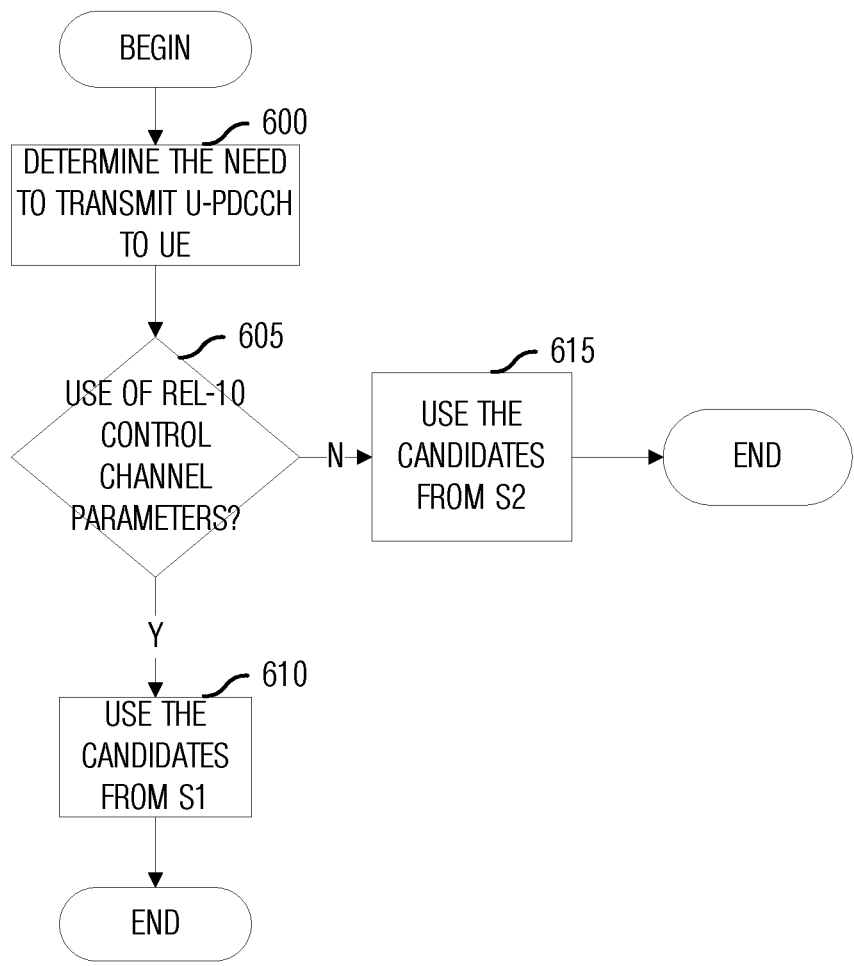
FIG. 6 illustrates an example flow diagram of eNB operations in transmitting a U-PDCCH with control channel parameters specified using a subset of candidates according to example embodiments described herein.

FIG. 6 illustrates a flow diagram of eNB operations in transmitting a U-PDCCH with control channel parameters specified using a subset of candidates. eNB operations may be indicative of operations occurring in an eNB, such as eNB 105, as the eNB transmits a U-PDCCH with control channel parameters specified using a subset of candidates.

eNB operations may begin with the eNB determining the need to transmit a control channel (e.g., a U-PDCCH) to a given UE (block 600). As an example, the eNB may determine the need to send the U-PDCCH to the UE when there a resource allocation for the UE. The eNB may determine whether to use control channel parameters compliant with 3GPP LTE Release-10 or to use more advanced control channel parameters (block 605). As an example, the decision to use 3GPP LTE Release-10 control channel parameters versus more advanced control channel parameters may be according to factors such as UE capability, channel condition, communications system condition, available resources, required or requested resources, and the like.

If the decision is to use 3GPP LTE Release-10 control channel parameters, the eNB may transmit the U-PDCCH using the control channel parameters associated with one of the candidates belonging to subset S1 to the UE (block 610). If it is to use more advanced control channel parameters, the eNB may transmit the U-PDCCH using the control channel parameters associated with one of the candidates belonging to subset S2 to the UE (block 615). As an example, if a candidate belonging to subset S2 specifies a specific MS, CR, RI, and/or AP then the eNB uses the specific MS, CR, RI, and/or AP as it prepares the U-PDCCH including the resource allocation information for transmission to the UE.

Figure 7:
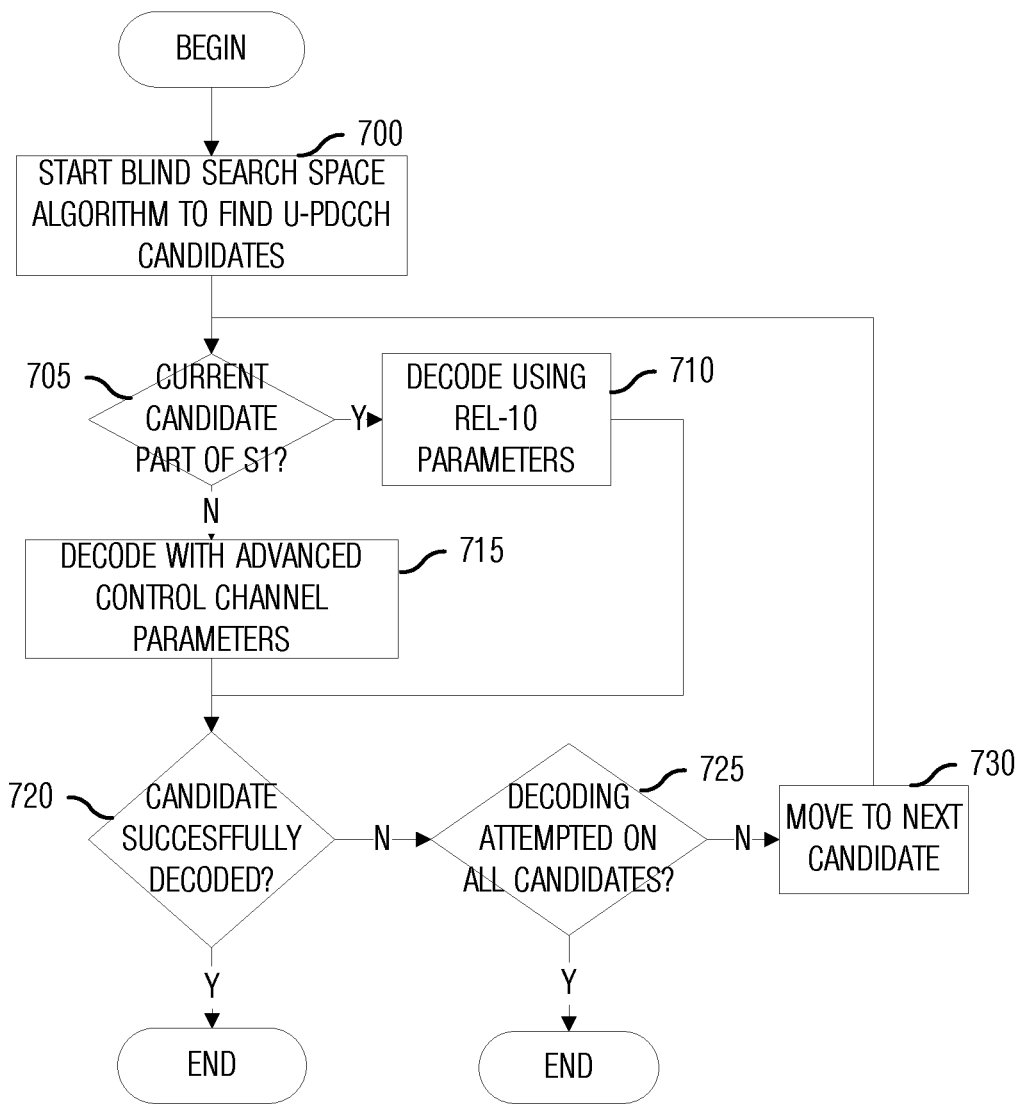
FIG. 7 illustrates an example flow diagram of UE operations in receiving a U-PDCCH wherein control channel parameters for the U-PDCCH are specified using a subset of candidates according to example embodiments described herein.

FIG. 7 illustrates a flow diagram of UE operations in receiving a U-PDCCH wherein control channel parameters for the U-PDCCH are specified using a subset of candidates. UE operations may be indicative of operations occurring in a UE, such as UE 110 and UE 120, as the UE receives the U-PDCCH, where control channel parameters for the U-PDCCH are specified using a subset of candidates.

UE operations may begin with the UE starting a search space algorithm to find candidate U-PDCCHs (block 700). As an example, the search space algorithm may implement a search technique, such as blind decoding to find the candidate U-PDCCHs. The UE may examine if a current candidate U-PDCCH is part of subset S1 or subset S2 (block 705). If the current candidate U-PDCCH is part of subset S1, the UE may apply the 3GPP LTE Release-10 control channel parameters to decode the current candidate U-PDCCH (block 710). Otherwise, the UE may use the advanced control channel parameters to decode the current candidate U-PDCCH (block 715). It is noted that if the advanced control channel parameters are to be used, there may be more than one combination of control channel parameters to test (e.g., use to decode the current candidate U-PDCCH) depending of the set of modulations available, the possible channel code rates, and the like. The UE may evaluate if the current candidate U-PDCCH has been successfully decoded (block 720), and if not, the UE may move on to the next candidate U-PDCCH (block 730) assuming that not all the candidate U-PDCCHs have been examined, e.g., tested (block 725). It is noted that there may be more than one candidate U-PDCCH for a UE in a subframe, for example, there may be candidates for a DL allocation and a UL allocation. The discussion of UE operations shown in FIG. 7 may be illustrative of operations in finding a single candidate. If there are multiple candidate U-PDCCHs to be found, then UE operations may be repeated to find additional candidate U-PDCCHs.

As another example, eligible combinations of the transmission format for U-PDCCH may vary with different Downlink Control Information (DCI) formats. For a single UE (or Relay node), multiple (typically 2 but other values are possible) DCI formats are blindly decoded, with one DCI Format (for example, DCI format 1A) being the fallback mode. The fallback mode may be restricted to only a few combinations, e.g., rank one, QPSK, no MU-MIMO, aggregation levels four and eight. Other restrictions on the combinations may include, for example, a) When the rank is two or higher, MU-MIMO may not be used;

b) For rank one and no MU-MIMO, only 16-QAM with aggregation level L=1 may be added, since 16-QAM with aggregation level two would have the same payload as Quadrature Phase Shift Keyed (QPSK) with aggregation level one; and c) PDCCH or R-PDCCH are used unless a new property where U-PDCCH is required is available (i.e., MU-MIMO or rank >1 with MS>QPSK, and the like).

Figure 8:
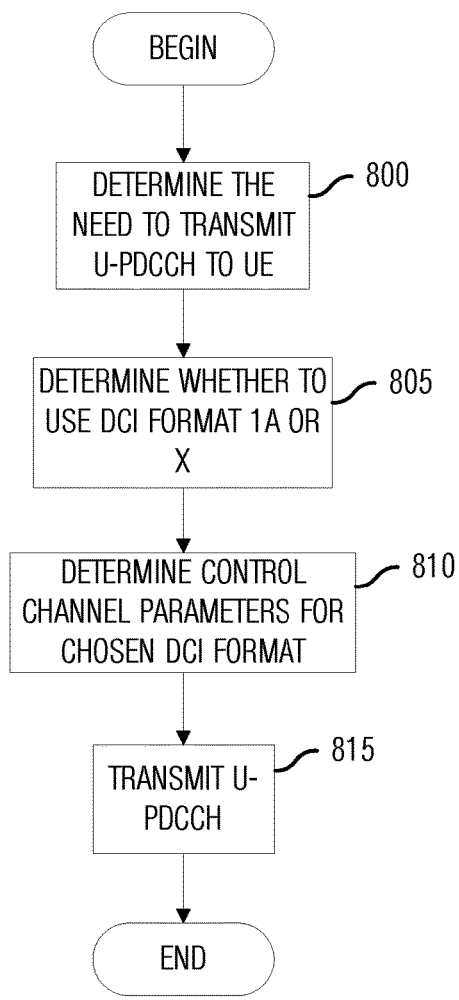
FIG. 8 illustrates an example flow diagram of eNB operations in transmitting a control channel to a UE where control channel parameters are different for different DCI formats according to example embodiments described herein.

FIG. 8 illustrates a flow diagram of eNB operations in transmitting a control channel to a UE where control channel parameters are different for different DCI formats. eNB operations may be indicative of operations occurring in an eNB, such as eNB 105, as the eNB transmits the control channel to a UE where control channel parameters are different for different DCI formats.

It is assumed that for each candidate, a first DCI format, e.g., DCI format 1A, is always possible with first control channel parameters, and a second format, DCI format X (where X could be any other DCI format, such as 1B, 2, 2A, for example) with second control channel parameters. eNB operations may begin with the eNB determining a need to transmit a U-PDCCH to the UE (block 800). As an example, the eNB may determine the need to send the U-PDCCH to the UE when there a resource allocation for the UE. The eNB may determine whether to use DCI format 1A or DCI format X (block 805). As an example, the eNB may determine the use of either DCI format 1A or DCI format X according to factors such as UE capability, channel condition, communications system condition, available resources, required or requested resources, and the like. The eNB may choose control channel parameters according to the chosen DCI format, i.e., DCI format 1A or DCI format X (block 810), and transmits the U-PDCCH accordingly (block 815). As discussed previously, transmitting the U-PDCCH may comprise generating the U-PDCCH according to the control channel parameters and then transmitting the U-PDCCH.

Figure 9:
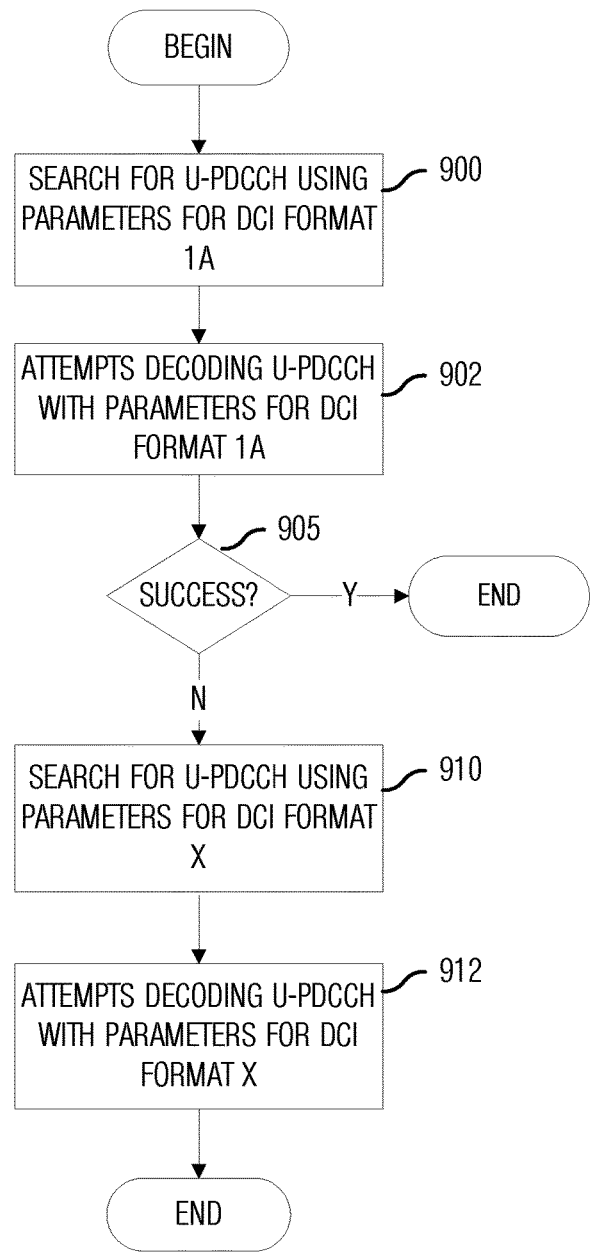
FIG. 9 illustrates an example flow diagram of UE operations in receiving a control channel where control channel parameters are different for different DCI formats according to example embodiments described herein.

FIG. 9 illustrates a flow diagram of UE operations in receiving a control channel where control channel parameters are different for different DCI formats. UE operations may be indicative of operations occurring in a UE, such as UE 110 and UE 120, as the UE receives a control channel with control channel parameters that vary according to DCI format.

UE operations may begin with the UE searching for the U-PDCCH according to control channel parameters associated with a first DCI format, e.g., DCI format 1A (block 900). The UE may also attempt to decode the U-PDCCH using the control channel parameters associated with the DCI format 1A (block 902). The UE may evaluate if the U-PDCCH has been successfully decoded (block 905). If yes, the U-PDCCH has been decoded. If not, the UE may move on to try to search for the U-PDCCH using control channel parameters for a second DCI format, e.g., DCI format X (block 910) and to decode the U-PDCCH using the control channel parameters for DCI format X (block 912).

It is noted that while the techniques has been described with DCI format 1A as the fallback mode, other DCI formats may be used for the fallback mode, such as DCI format 1C. It is also noted that in some cases, the UE may not attempt to decode. For instance, as discussed previously, the fall back mode may be applied to aggregation levels 4 and 8 only. Then, in such a situation, for aggregation level 1 or 2, for example, the UE may skip block 902 and immediately attempts the searching and the decoding using control channel parameters associated with DCI format X (blocks 910 and 912). Furthermore, while the techniques may be described with the UE attempting searching and/or decoding for DCI format 1A first and then followed by searching and/or decoding for DCI format X, the reverse is also possible, and the UE may start searching and/or decoding according to the DCI format X first, and then searching and/or decoding according to the DCI format 1A.

Some of the examples of feasible combinations and the restrictions of the combinations are listed in Table 1. It is noted that the information in Table 1 is for illustration only and that different values may be used. It is further noted that MU-MIMO is not added as a possibility for this embodiment, but could easily be added.

TABLE 1

Example Control Channel Parameters.

| Index | Modulation | Coding rate | Rank |
|---|---|---|---|
| 1 | QPSK | 0.25 | 1 |
| 2 | QPSK | 0.5 | 1 |
| 3 | QPSK | 0.75 | 1 |
| 4 | 16-QAM | 0.5 | 1 |
| 5 | 16-QAM | 0.5 | 2 |
| 6 | 16-QAM | 0.75 | 1 |
| 7 | 16-QAM | 0.75 | 2 |
| 8 | 64-QAM | 0.75 | 1 |
| 9 | 64-QAM | 0.75 | 2 |
| 10 | 64-QAM | 0.75 | 4 |

As yet another example, a reduced complexity algorithm may allow the control channel parameters to change slowly from transmission to transmission. As an example of a reduced complexity algorithm that permits slow changes in control channel parameters may be as follows: if control channel parameters corresponding to an index I were used in a previous subframe, then in a subsequent subframe only transmission parameters corresponding to indices I−1, I, or I+1 may be used. Referring back to Table 1 as an illustrative example, if control channel parameters corresponding to index 5 were used in subframe m, then in subframe m+1, control channel parameters corresponding to indices 4, 5, or 6 may be used.

It is noted that although adjacent indices of control channel parameters are discussed, other control channel parameters may be used. As an example, I−2, I, or I+2 may be used. As another example, I−1, I, or I+2 may be used. As yet another example, I−2, I−1, or I may be used. In general, as long as both the eNB and the UE knows which possible control channel parameters may be used, any possible selection of control channel parameters may be used. The above discussed examples are intended to be illustrative examples and their discussion should not be construed as being limiting to either the scope or the spirit of the example embodiments.

Figure 10:
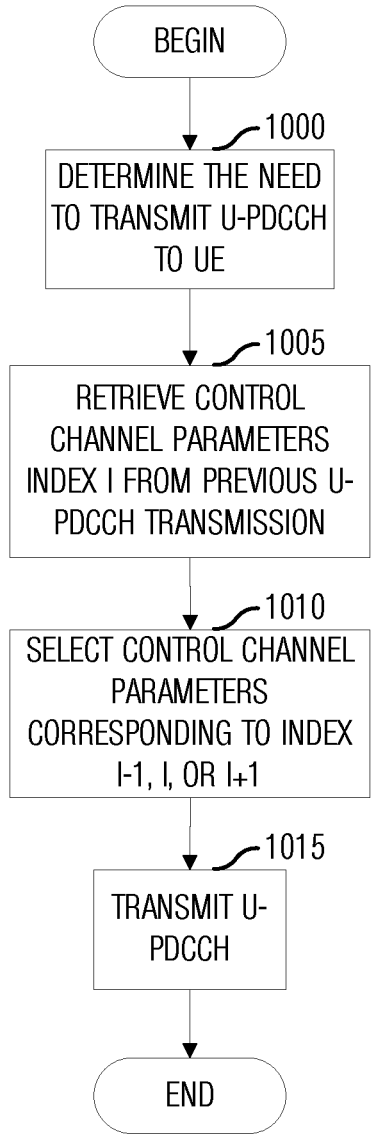
FIG. 10 illustrates an example flow diagram of eNB operations in transmitting U-PDCCH with control channel parameters selected using a reduced complexity technique according to example embodiments described herein.

FIG. 10 illustrates a flow diagram of eNB operations in transmitting U-PDCCH with control channel parameters selected using a reduced complexity technique. eNB operations may be indicative of operations occurring in an eNB, such as eNB 105, as the eNB transmits a U-PDCCH selected using a reduced complexity technique.

eNB operations may begin with the eNB determining a need to transmit the U-PDCCH to a given UE (block 1000). As an example, the eNB may determine the need to send the U-PDCCH to the UE when there is a resource allocation (or some other form of control information, such as configuration information, power control, hybrid automatic repeat requested (HARQ), and the like) for the UE. The eNB may retrieve control channel parameters corresponding to index I, the storage index of control channel parameters for a previous U-PDCCH transmission. As an example, refer to Table 1 for example indexed control channel parameters. The eNB may select control channel parameters corresponding to indexes I−1, I, or I+1 (block 1010). As an example, the eNB may consider factors such as channel condition, communications system condition, available resources, required or requested resources, and the like to select control channel parameters corresponding to indexes I−1, I, or I+1. The eNB may proceed to generate and transmit the U-PDCCH using the selected control channel parameters (block 1015).

Figure 11:
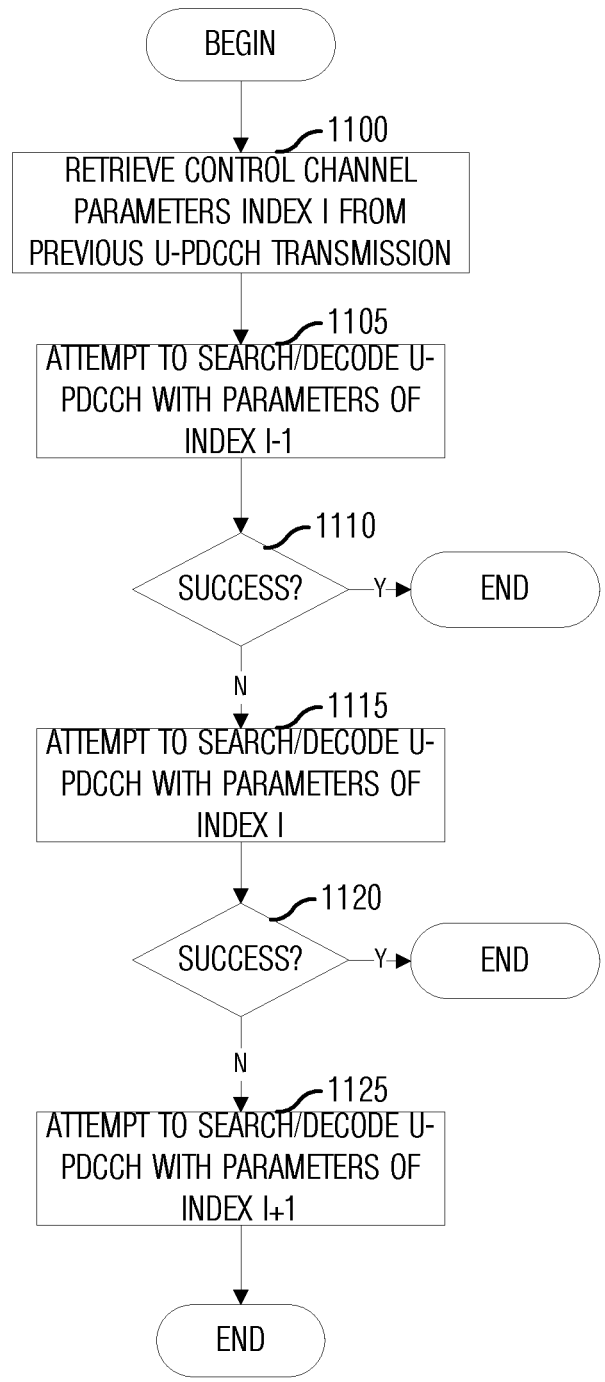
FIG. 11 illustrates an example flow diagram of UE operations in receiving a U-PDCCH wherein control channel parameters for the U-PDCCH are selected using a reduced complexity technique according to example embodiments described herein.

FIG. 11 illustrates a flow diagram of UE operations in receiving a U-PDCCH wherein control channel parameters for the U-PDCCH are selected using a reduced complexity technique. UE operations may be indicative of operations occurring in a UE, such as UE 110 and UE 120, as the UE receives a U-PDCCH that was transmitted using a reduced complexity technique.

UE operations may begin with the UE retrieving control channel parameters associated with an index of a previous U-PDCCH transmission, I (block 1100). The UE may attempt to search and decode the U-PDCCH with the control channel parameters associated with index I−1 (block 1105). If successful (block 1110), the process is finished since the UE has decoded the U-PDCCH. If unsuccessful, the UE may attempt to search and decode the U-PDCCH with the control channel parameters associated with index I (block 1115). If successful (block 1120), the process is finished since the UE has decoded the U-PDCCH. If unsuccessful, the UE may attempt to search and decode the U-PDCCH with the control channel parameters associated with index I+1 (block 1125). It is noted that the ordering of the use of the indices may change without negatively impacting the technique.

It is noted that while the techniques described above are described for three consecutive indices, the techniques discussed may be extended to any set of S indices, consecutive or not. It is also noted that in the description, the index from a previous U-PDCCH transmission, I, is used. However, if there has not been any U-PDCCH transmission for a long time, the radio environment experienced by the UE might have significantly changed. In such a situation, after a predetermined time (based on a timer, for example), the control channel parameters for the U-PDCCH may be erased, and the U-PDCCH transmission may make use of control channel parameters associated with a lowest index or a randomly selected index. Alternatively, one of the 3GPP LTE Release-10 transmission modes could be used.

It is also noted that the previously described algorithms may be jointly used. As an example, for the candidates with DCI format 1A, the 3GPP LTE Release-10 control channel parameters may be used, while for DCI format X, the previously described algorithm (i.e., the reduced complexity technique) may be used. The combination of the above discussed techniques may ensure robust transmission, and reduce the risk of the UE not being able to successfully decode the U-PDCCH.

The use of restrictions, such as those described above, may place a reasonable cap on a maximum number of blind decoding attempts made by a UE. Therefore, it may be a feasible tradeoff that the UE (or the relay node) to at least blindly decode for some control channel parameters instead of entirely relying on blind decoding.

Another technique that may be used for signaling of the control channel parameters of a U-PDCCH is to introduce a new DCI format or new control channel to indicate at least some of the control channel parameters of a U-PDCCH to a UE. Higher layer signaling may be deemed sub-optimal for a cellular system with high mobility UEs. While relying on blind decodes only may require a large amount of computational complexity at the UE (or relay node).

In order to improve performance above and beyond higher layer signaling and/or blind decoding, it is proposed to use signaling sent on a common search space to indicate at least some of the control channel parameters of the U-PDCCH. It is noted that the common search space may be the PDCCH common search space or a newly configured common search space for U-PDCCH. It is also noted that the previous techniques for simplifying the control channel parameters through the use of the eligible combinations and/or the restrictions of combinations of the control channel parameters of the U-PDCCH may also be applied here.

As an example, the technique of using a control channel to signal the control channel parameters of a U-PDCCH to a UE may be as follows:

1. The UE is assigned to a group. Each group has a unique group ID, for example, a U-PDCCH Radio Network Temporary Identifier (U-PDCCH-RNTI) may be used as a group ID. Within each group, each UE has a U-PDCCH Index. The group ID and/or U-PDCCH Index may be communicated through higher layer signaling;

2. In a common search space (e.g., in the U-PDCCH region, or the PDCCH region if the U-PDCCH region does not have a common search space), the eNB may send a group command using a new DCI format to indicate at least some combinations of the control channel parameters of the U-PDCCH (such as, RI, MS, CR, AP, and the like) to the UEs in the group; and 3. The UE uses the received control channel parameters and initiates the blind decoding process to find its specific U-PDCCH.

Figure 12:
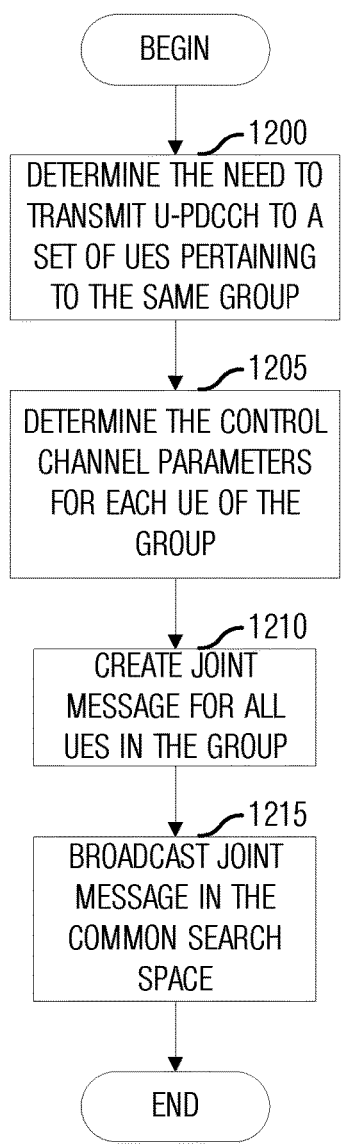
FIG. 12 illustrates an example flow diagram of eNB operations in an eNB for transmitting a U-PDCCH using UE groups and a control channel to signal the control channel parameters of U-PDCCHs according to example embodiments described herein.

FIG. 12 illustrates a flow diagram of eNB operations in an eNB for transmitting a U-PDCCH using UE groups and a control channel to signal the control channel parameters of U-PDCCHs. eNB operations may be indicative of operations occurring in an eNB, such as eNB 105, as the eNB transmits a U-PDCCH using UE groups and a control channel to signal the control channel parameters of the U-PDCCHs.

eNB operations may begin with the eNB determining a need to transmit U-PDCCHs for a group of UEs (block 1200). As an example, the eNB may determine the need to send the U-PDCCHs to the group of UEs when there a resource allocation(s) for at least some of the UEs. It may be assumed that the group of UEs was previously created and may be referenced by a group ID, e.g., a U-PDCCH-RNTI. It may also be assumed that all the UEs in the group of UEs are aware of being a member of the group of UEs.

The eNB may determine the control channel parameters and an index referring to the control channel parameters for each of the UEs of the group that is receiving U-PDCCHs (block 1205). The eNB may create a joint message, e.g., a control channel parameter message, for all UEs in the group of UEs (block 1210). The eNB may transmit (e.g., broadcast) the joint message in a common search space of the PDCCH or U-PDCCH region (block 1215). As discussed previously, the eNB may make use of the common search space of the PDCCH region if there is not a common search space in the U-PDCCH region.

Figure 13:
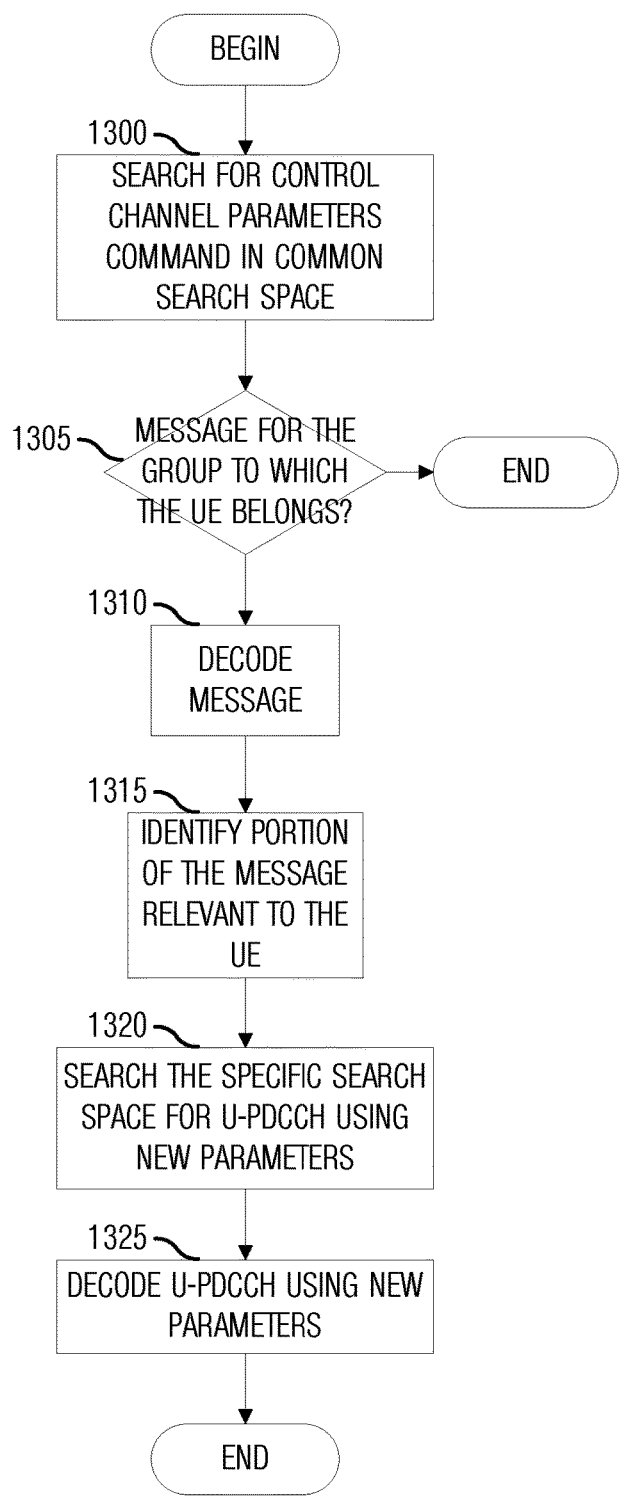
FIG. 13 illustrates an example flow diagram of UE operations in a UE receiving a U-PDCCH, where the UE is a member of a group of UEs and a control channel is used by an eNB to signal control channel parameters according to example embodiments described herein.

FIG. 13 illustrates a flow diagram of UE operations in a UE receiving a U-PDCCH, where the UE is a member of a group of UEs and a control channel is used by an eNB to signal control channel parameters. UE operations may be indicative of operations occurring in a UE, such as UE 110 and UE 120, as the UE receives a U-PDCCH, where the UE is a member of a group of UEs and a control channel is used by an eNB to signal control channel parameters to the UE.

UE operations may begin with the UE searching for a control channel parameter message for its group (e.g., addressed to the UE's group ID) in a common search space of either the PDCCH region or the U-PDCCH region (block 1300). If such a message is found (block 1305), the UE may decode it (block 1310). As an example, since the control channel parameter message is signaled in the common search space, the UE may be able to readily find the message and decode the message. The UE may identify a portion of the control channel parameter message relevant for itself and obtain the control channel parameters for a U-PDCCH transmission it is to receive (block 1315). The UE may search its specific U-PDCCH search space to find its U-PDCCH using the control channel parameters (block 1320). The UE may decode its U-PDCCH using the control channel parameters (block 1325).

It is noted that in the examples discussed previously, an index is used to reference each set of control channel parameters. The index may be used to reduce signaling overhead, but it is not necessary to use the index. Furthermore, sending the message in the common search space is not necessary. Alternatively, the message may be broadcasted elsewhere, multicasted to the group, e.g., using higher layer signaling if changes in transmission parameters are rare, and the like. Additionally, if a UE of a group does not have any control channel parameters (i.e., the UE does not have a pending resource allocation), an index associated with a pre-defined value, such as all 0s, all 1's, or some other specified value, may be sent for this particular UE. The transmission of a pre-defined value for a UE without control channel parameters has the added benefit of notifying the UE that it does not have to perform any blind decoding on its UE-specific U-PDCCH search space.

The control channel parameter signaling for a group of UEs using a control channel may include a group ID (e.g., a U-PDCCH-RNTI), a unique UE identifier, and an aggregated message containing the control channel parameters for the UEs in the group of UEs. The U-PDCCH-RNTI can be sent implicitly, e.g., by scrambling the CRC of the control signaling using the U-PDCCH-RNTI. The U-PDCCH-RNTI may be also implicitly derived from another identifier, such as the UE RNTI. The aggregated message (denoted herein as U-PDCCH indication message) may a structure as described below.

As an example, in the message sent to the group of UEs, each UE may have a corresponding field within the message. The field of each UE occupies k bits, where k is a non-negative, non-zero integer value. These k bits indicate a combination of the control channel parameters. As an example, the indication of the combination of the control channel parameters through the k bit field may be absolutely encoded where the combination of the control channel parameter is indicated by the field of a most recent message independent of previous messages or the previous transmission format of the U-PDCCH. As another example, the indication of the combination of the control channel parameters through the k bit field may be differentially encoded where the combination of the control channel parameters is indicated by the k bit field of a most recent message and a previous message(s) or the previous transmission format of the U-PDCCH. The set of the combinations of the control channel parameters indicated by the k bit field may be configurable and signaled by the higher layer signaling. In practice, k should be small, i.e., to help reduce overhead, and should be in the order of 1~3.

If there are M UEs, the aggregated message includes k×M bits. Padding may be used to align the length of the DCI format to other existing formats to reduce complexity. The location of the field associated a UE may be determined by its U-PDCCH index. As an example, a UE with U-PDCCH index j may be uniquely assigned a set of k bits ranging from bits j×M, . . . , j×M+k−1.

It is noted that for practical operations, it might be useful to have M set to a fixed value, and have the control channel parameter message the same size of a DCI format 1A. If there are fewer than M UEs, the unused parts (i.e., the portion of the control channel parameter message assigned to UEs that are not present) may be ignored.

Figure 14:
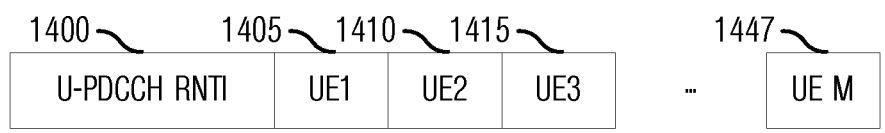
FIG. 14 illustrates an example structure for the control channel parameter message according to example embodiments described herein.

FIG. 14 illustrates an example structure for the control channel parameter message. The message comprises at least: the group ID or indicator (e.g., U-PDCCH-RNTI) in block 1400, and an indication of the transmission parameters for each user 1, 2, . . . , M (blocks 1405, 1410, 1415, . . . , 1447). It is noted that fields for the purpose of sending other control information may be included as well in this message. In order for the UE to be able to find its control channel parameters, the UE may need to know its group ID (e.g., U-PDCCH RNTI) and its order in the group of UEs to know which bits to examine in the group command.

Figure 15:
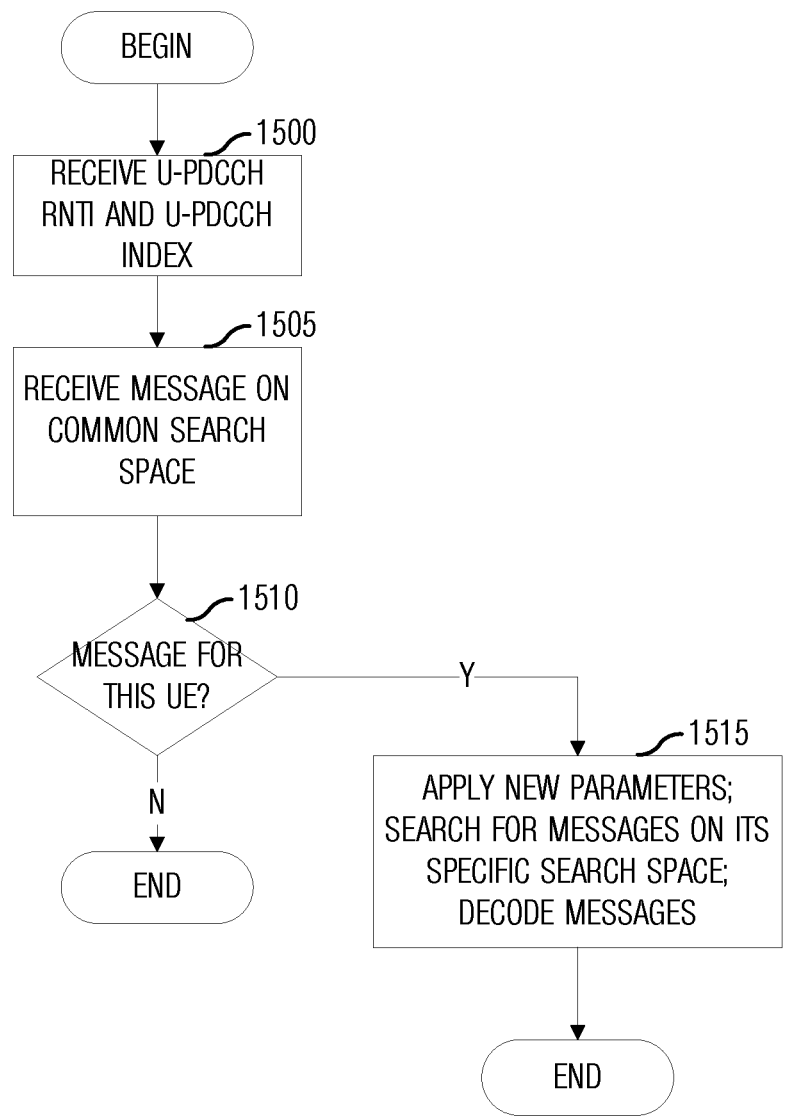
FIG. 15 illustrates an example flow diagram of UE operations for receiving a U-PDCCH, where control channel parameters are signaled in a group message according to example embodiments described herein.

FIG. 15 illustrates a flow diagram of UE operations for receiving a U-PDCCH, where control channel parameters are signaled in a group message. UE operations may be indicative of operations in a UE, such as UE 110 and UE 120, as the UE receives a U-PDCCH where control channel parameters for the U-PDCCH are signaled to the UE in a group message.

UE operations may begin with the UE receiving a group ID, e.g., a U-PDCCH-RNTI, and an index, e.g., a U-PDCCH INDEX (block 1500). As an example, the group ID may be used to identify a group of UEs to which the UE belongs, while the index may identify a position of the UE in the group of UEs. The UE may receive a group message, e.g., a control channel parameter message, from an eNB (block 1505). The group message may be addressed to the group ID, which indicates to the UE that the group message is addressed to the UE (block 1510).

If the group message is intended for the UE, then the UE may use the index to determine its control channel parameters. The UE may make use of the control channel parameters to search for its U-PDCCH as well as decode its U-PDCCH (block 1515). If the group message is not intended for the UE, then the UE may wait for another group message.

It is noted that the number of bits transmitted in a group message (e.g., the U-PDCCH indication message) for each UE should be fairly small. Therefore, it may be advantageous to utilize a combination of the group message technique and the blind decoding technique, as described previously, to help reduce the number of bits that need to be transmitted in the group message for each UE. As an example, Table 2 displays example combinations of control channel parameters in an absolute format with four bits, and Table 3 displays example combinations of control channel parameters in a differential format.

TABLE 2

Example Control Channel Parameters Using Absolute Signaling.

| Index | Modulation | Coding rate | Rank |
|---|---|---|---|
| 1 | QPSK | 0.25 | 1 |
| 2 | QPSK | 0.5 | 1 |
| 3 | QPSK | 0.75 | 1 |
| 4 | 16-QAM | 0.5 | 1 |
| 5 | 16-QAM | 0.5 | 2 |
| 6 | 16-QAM | 0.75 | 1 |
| 7 | 16-QAM | 0.75 | 2 |
| 8 | 64-QAM | 0.75 | 1 |
| 9 | 64-QAM | 0.75 | 2 |
| 10 | 64-QAM | 0.75 | 4 |

TABLE 3

Example Control Channel Parameters Using Differential Signaling.

| Index (binary) | Action |
|---|---|
| x10 | Decrease index by 2 |
| x11 | Decrease index by 1 |
| x00 | Keep same index |
| x01 | Increase index by 1 |

It is noted that the indices in the Table 3 refer to the index of the absolute table. As an example, if 16-QAM rate ½ with rank 1 (which corresponds to Index 5 in Table) was used in a previous U-PDCCH, and a message with index "x10" is received, the UE may then use the control channel parameters corresponding to Index 3 (QPSK rate ¾ with rank 1). It is also noted that with Table 3, receiving an index of 0 ("x00") may not imply that the UE does not get an assignment (i.e., a U-PDCCH), but that the control channel parameters for the U-PDCCH are not modified.

The formatting used in the control channel parameter message, while described for transmitting control channel parameters, may also be used for other purposes. As an example, the message format may also be used for indicating whether the UE should monitor the PDCCH or the U-PDCCH (or both). In such a situation, the UEs are grouped as previously described (i.e., into groups of UEs), and the group message may have the same structure. Each UE in the group of UEs may be assigned a one bit value, with a first value (e.g., "x0") indicating that the UE is to monitor the PDCCH control region, and a second value (e.g., "x1") indicating that the UE is to monitor the U-PDCCH control region. If more possibilities are desirable, such as monitor both the PDCCH and U-PDCCH region, then additional bits are required.

Similarly, the same message format may be used to indicate a location (time and/or frequency) of the U-PDCCH. As an example, assume that a UE may be allocated any set of resources, e.g., RBs, for the U-PDCCH search space within a pre-determined set of possible search spaces, e.g., 32 possible search spaces (although other numbers of possible search spaces may be possible). Each search space candidate may then be uniquely identified by a 5-bit value. A message with a structure similar to that described in FIG. 14 may be transmitted, with the part of the message for a specific UE indicating using 5 bits which set of resources, e.g., RBs, to search in for the U-PDCCH.

As an example, fast rank adaptation may be implemented for U-PDCCH by sending the group message to indicate the rank of U-PDCCH. As another example, dynamic MU-MIMO UE pairing between a first U-PDCCH and a second U-PDCCH or a R-PDCCH by sending the group message to the UE(s) monitoring U-PDCCH to indicate the antenna port(s) of U-PDCCH transmission.

As yet another example, the group message can be used to inform the UE where to detect its downlink control information (DCI). As yet another example, the group message may indicate the UE to detect its DCI in the PDCCH region or U-PDCCH region. As yet another example, the group message may inform UE the time and/or frequency location of its U-PDCCH region.

Reliability in the detection of the U-PDCCH may need to be ensured since control channel information is typically crucial to the operation of the communications system and parts thereof. As an example, in order to help ensure reliable U-PDCCH detection, the UE may send an acknowledgement back to the eNB when the UE receives a group message that provides the UE with new control channel parameters. As another example, the control channel parameters may be reset to a specified value through higher layer signaling or a group message in predefined subframes. As yet another example, the eNB may send a new DCI message, such as a DCI format 3B message, with the same content (e.g., the control channel parameters) multiple times if needed to significantly reduce the probability of error.

An example communications system may be as follows:

Any eNB may be capable of transmitting both the PDCCH and the U-PDCCH. While Release-10 or earlier UEs only monitor the PDCCH, 3GPP LTE Release-11 UEs or later can monitor both the PDCCH and the U-PDCCH. The ability to monitor U-PDCCH is a UE capability;

UEs capable of monitoring the U-PDCCH may first look at the PDCCH common search space. Each UE is assigned to monitor either the PDCCH and/or the U-PDCCH by higher layer signaling;

UEs that may monitor the U-PDCCH first decode the PDCCH common search space. In this region, there is an indicator (e.g., a single bit indicator) to indicate whether the U-PDCCH is present or not. In the common search space, there is also a new DCI message, such as a DCI format 3B message, to indicate the control channel parameters (i.e., the U-PDCCH parameters);

Additionally, a UE may find a message to indicate a reconfiguration of the search space for the U-PDCCH. If no message is present, the UE may assume that the UE-specific search space is the same as before. If there is a message, the UE immediately uses the new configuration;

The U-PDCCH may start on a symbol immediately following the PDCCH; and

If a UE receives an indication to monitor the U-PDCCH, the UE may attempt blind decoding on its UE-specific U-PDCCH search space with the control channel parameters. If the UE does not receive such an indication, the UE may assume that it has no assignment, and does not need to perform additional blind decodes on the PDCCH region.

Figure 16:
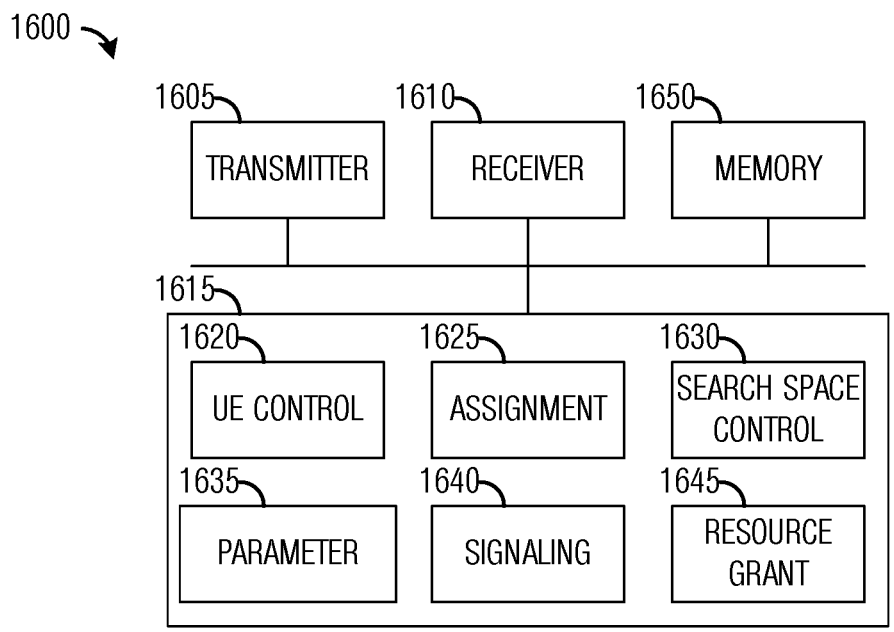
FIG. 16 illustrates an example first communications device according to example embodiments described herein.

FIG. 16 illustrates a communications device 1600. Communications device 1600 may be used to implement various ones of the embodiments discussed herein. As shown in FIG.

16, a transmitter 1605 is configured to transmit information and a receiver 1610 is configured to receive information. Transmitter 1605 and receiver 1610 may have a wireless interface, a wireline interface, or a combination thereof.

A UE controller 1620 is configured to determine which control channel(s) a UE is to monitor. The determination may be based on a number of factors, such as UE capability, communications system capability, and so on. An assignment unit 1625 is configured to assign a UE to monitor a control channel(s). For example, assignment unit 1625 may assign a UE to monitor a PDCCH, a U-PDCCH, or both PDCCH and U-PDCCH. A search space controller 1630 is configured to specify a search space or a set of search spaces (possibly out of a number of possible search spaces) where a UE may search to find a U-PDCCH. A parameter unit 1635 is configured to select and/or assign control channel parameters, such as rank, coding rate, modulation scheme, antenna port, and so forth, to a UE. A signaling unit 1640 is configured to generate messages and/or indications to be transmitted to a UE, where the messages and/or indications convey channel assignments, control channel parameters, and so on. Signaling unit 1640 is configured to generate messages and/or indications according to the control channel parameters. A memory 1645 is configured to store information, such as channel assignment, control channel parameters, etc.

The elements of communications device 1600 may be implemented as specific hardware logic blocks. In an alternative, the elements of communications device 1600 may be implemented as software executing in a processing unit such as processor (e.g., microprocessor or digital signal processor), controller, application specific integrated circuit, or so on. In yet another alternative, the elements of communications device 1600 may be implemented as a combination of software and/or hardware.

As an example, transmitter 1605 and receiver 1620 may be implemented as a specific hardware block, while UE controller 1620, assignment unit 1625, search space controller 1630, parameter unit 1635, and signaling unit 1640 may be software modules executing in a microprocessor or a custom circuit or a custom compiled logic array of a field programmable logic array.

Figure 17:
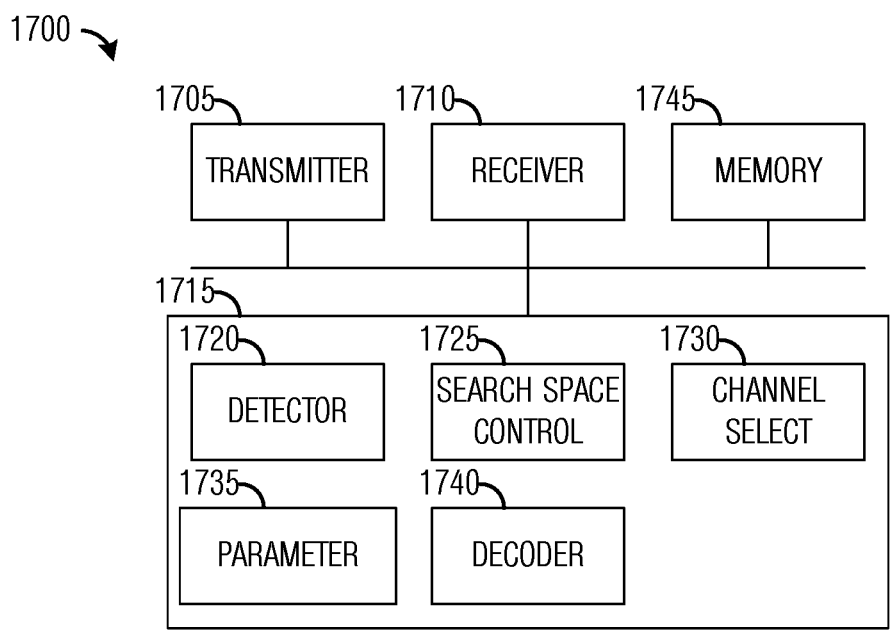
FIG. 17 illustrates an example second communications device according to example embodiments described herein.

FIG. 17 illustrates a communications device 1700. Communications device 1700 may be used to implement various ones of the embodiments discussed herein. As shown in FIG. 17, a transmitter 1705 is configured to transmit information and a receiver 1710 is configured to receive information. Transmitter 1705 and receiver 1710 may have a wireless interface, a wireline interface, or a combination thereof.

A detector 1720 is configured to detect transmissions by search a search space for the transmissions. A search space controller 1725 is configured to control the searches made by communications device 1700 based on search space(s) specified by an eNB controlling the communications device 1700, as well as control channel parameters. A channel selector 1730 is configured to select a control channel to monitor based on instructions from the eNB, power measurements, performance metrics, and so on. A parameter unit 1735 is configured to process control channel parameters provided by the eNB. A decoder 1740 is configured to decode signals detected in a control channel according to control channel parameters. A memory 1745 is configured to store information, such as channel assignment, parameters, etc.

The elements of communications device 1700 may be implemented as specific hardware logic blocks. In an alternative, the elements of communications device 1700 may be implemented as software executing in a processing unit such as processor (e.g., microprocessor or digital signal processor), controller, application specific integrated circuit, or so on. In yet another alternative, the elements of communications device 1700 may be implemented as a combination of software and/or hardware.

As an example, transmitter 1705 and receiver 1720 may be implemented as a specific hardware block, while detector 1720, search space controller 1725, channel selector 1730, parameter unit 1735, and decoder 1740 may be software modules executing in a microprocessor or a custom circuit or a custom compiled logic array of a field programmable logic array.

Advantageous features of embodiments of the disclosure may include: A method, for a wireless node, to send transmission parameters to a set of remote wireless nodes, wherein the transmission parameters are applied to a control channel, and wherein the control channel location is unknown by the set of remote wireless nodes. The method could further include, wherein the transmission parameters comprises at least one of the following: modulation, channel coding rate, transmission rank, antenna port to use for a MU-MIMO transmission.

The method could further include, wherein the transmission parameters are sent by higher layer signaling. The method could further include, wherein the transmission parameters remain valid until a new message is received. The method could further include, wherein the wireless node receives an acknowledgement message from the remote wireless nodes.

Advantageous features of embodiments of the disclosure may include: A method, for a remote wireless node, to receive parameters from a wireless node, wherein the transmission parameters are applied to a control channel, and wherein the control channel location is unknown by the remote wireless node. The method could further include, wherein the transmission parameters comprises at least one of the following: modulation, channel coding rate, transmission rank, antenna port to use for a MU-MIMO transmission.

The method could further include, wherein the transmission parameters are received over higher layer signaling. The method could further include, wherein the transmission parameters remain valid until a new message is received. The method could further include, further comprising transmitting an acknowledgement message.

Advantageous features of embodiments of the disclosure may include: A method, for a wireless node, to send control channel information to a remote wireless node, wherein the search space where to find the control channel information is known by the remote wireless node. The method could further include, wherein if the control information is sent on some pre-defined resources, a first set of transmission parameters is applied. The method could further include, wherein if the control information is sent on another set of resources, a second set of transmission parameters is applied.

The method could further include, wherein the first set of transmission parameters is known by the remote wireless node. The method could further include, wherein the resource includes transmitting a message with a known DCI format. The method could further include, wherein the resource includes a specific candidate in the search space. The method could further include, wherein the change of transmission parameters between two transmission instances is restricted. The method could further include, wherein if the time difference between two transmission instances is larger than a predefined threshold, the remote node uses known values for at least some of the transmission parameters.

Advantageous features of embodiments of the disclosure may include: A method for a wireless node to send transmission parameters to a plurality of remote wireless node, wherein the transmission parameters are to be used on a control channel, the method comprising: grouping the plurality of wireless nodes into one or more set of wireless nodes; assigning a unique identifier to each of the set of wireless nodes; and transmitting a unique message to each of the set of wireless nodes to notify them of the transmission parameters. The method could further include, wherein the membership of one wireless node to a given set of wireless nodes is determined based on the UE RNTI of the wireless node. The method could further include, wherein the message sent to each of the set comprises one field with the group identity, and one field for each of the wireless nodes of the group, this field containing an indication of the transmission parameters.

The method could further include, wherein the indication of the transmission parameters in an absolute indication. The method could further include, wherein the indication of the transmission parameters is a relative indication. The method could further include, wherein the transmission parameters indicates if the remote wireless node monitors a first control region or a second control region. The method could further include, wherein the transmission parameter indicates to the remote wireless node the search space location.

The method could further include, wherein the wireless node receives an acknowledgement for each of the remote wireless nodes. The method could further include, wherein the unique message is transmitted multiple times. The method could further include, wherein the unique message indicates to each of the wireless nodes which rank to use.

Although the present disclosure and its advantages have been described in detail, it should be understood that various changes, substitutions and alterations can be made herein without departing from the spirit and scope of the disclosure as defined by the appended claims.

What is claimed is:

1. A method comprising:
   transmitting, by a communications controller to a wireless node using higher layer signaling, a first parameter indicator identifying a first set of control channel parameters associated with a wireless node-specific search space locatable in any symbol of a time slot of a subframe, the first set of control channel parameters comprising an aggregation level and indicating a time and frequency resource used for the wireless node-specific search space;
   modulating, by the communications controller, control information, the control information pertaining to configuration of a data channel;
   mapping, by the communications controller, the modulated control information onto the time and frequency resource for the wireless node-specific search space in the time slot of the subframe;
      the time slot including a common search space in addition to the wireless node-specific search space, a second set of control channel parameters being associated with the common search space;
      at least one of the modulating the control information and the mapping the modulated control information being performed according to the first set of control channel parameters associated with the wireless node-specific search space; and
      a location of the modulated control information being designated by search space rules for the wireless node-specific search space; and
   transmitting, by the communications controller, the time slot to the wireless node.

2. The method of claim 1, wherein the wireless node-specific search space is located in a data region of the time slot, and the common search space is located in a control region of the time slot.

3. The method of claim 1, further comprising transmitting the first parameter indicator using radio resource control signaling.

4. The method of claim 1, further comprising transmitting the first parameter indicator to a group of wireless nodes including the wireless node.

5. The method of claim 4, further comprising transmitting a group message including a plurality of first parameter indicators to the group of wireless nodes.

6. The method of claim 5, wherein the group message is addressed to the group of wireless nodes.

7. The method of claim 1, wherein the first parameter indicator includes an index to the first set of control channel parameters in a list of allowable sets of control channel parameters.

8. The method of claim 1, wherein the aggregation level is 1, 2, 4 or 8.

9. The method of claim 1, wherein the mapping the modulated control information comprises mapping the modulated control information onto symbols of the time slot.

10. The method of claim 1, wherein the common search space is located in a data region of the time slot, and wherein the method further comprises:
   modulating, by the communications controller, second control information, the second control information pertaining to configuration of a second data channel; and
   mapping, by the communications controller, the modulated second control information onto time and frequency resources associated with the common search space in the time slot;
      at least one of the modulating the second control information and the mapping the modulated second control information being performed according to the second set of control channel parameters associated with the common search space.

11. The method of claim 1, the first set of control channel parameters further comprising a modulation scheme, a coding rate, an antenna port number, a number of transmission layers, a number of antenna ports, or a combination thereof.

12. The method of claim 1, wherein the aggregation level determines a number of control information candidates in the wireless node-specific search space.

13. The method of claim 1, wherein the modulating comprises encoding the control information according to the aggregation level.

14. The method of claim 1, wherein the second set of control channel parameters comprises a second aggregation level.

15. The method of claim 1, wherein the time and frequency resource comprises the any symbol of the time slot.

16. The method of claim 1, wherein the wireless node-specific search space is in more than one symbol of the time slot of the subframe.

17. A method comprising:
   receiving, by a wireless node via higher layer signaling, a first parameter indicator identifying a first set of control channel parameters associated with a wireless node-specific search space locatable in any symbol of a time slot of a subframe, the first set of control channel parameters comprising an aggregation level and indicating a time and frequency resource used for the wireless node-specific search space;

receiving, by the wireless node, the time slot of the subframe from a communications controller, the time slot comprising modulated control information mapped to the time and frequency resource for the wireless node-specific search space in the time slot of the subframe, and the modulated control information pertaining to configuration of a data channel;
the time slot including a common search space in addition to the wireless node-specific search space, a second set of control channel parameters being associated with the common search space; and
a location of the modulated control information being designated by search space rules for the wireless node-specific search space;

searching, by the wireless node, for the modulated control information in the wireless node-specific search space; and demodulating, by the wireless node, the modulated control information, at least one of the searching for the modulated control information and the demodulating the modulated control information being performed according to the first set of control channel parameters.

18. The method of claim 17, wherein the wireless node-specific search space is located in a data region of the time slot, and the common search space is located in a control region of the time slot.

19. The method of claim 17, further comprising receiving the first parameter indicator using radio resource control signaling.

20. The method of claim 17, further comprising receiving the first parameter indicator in a group message intended for a group of wireless nodes including the wireless node.

21. The method of claim 20, wherein the group message includes a plurality of first parameter indicators to the group of wireless nodes.

22. The method of claim 21, wherein the group message is addressed to the group of wireless nodes.

23. The method of claim 17, wherein the first parameter indicator includes an index to the first set of control channel parameters in a list of allowable sets of control channel parameters.

24. The method of claim 17, wherein the aggregation level is 1, 2, 4 or 8.

25. The method of claim 17, wherein the modulated control information is mapped onto symbols of the time slot.

26. The method of claim 17, the common search space being located in a data region of the time slot, the time slot comprising second modulated control information mapped to second resources associated with the common search space, the second modulated control information pertaining to configuration of a second data channel, and wherein the method further comprises:
searching, by the wireless node, for the second modulated control information in the common search space; and
demodulating, by the wireless node, the second modulated control information;
at least one of the searching for the second modulated control information and the demodulating the second modulated control information being performed according to the second set of control channel parameters associated with the common search space.

27. The method of claim 26, the second set of control channel parameters further comprising a second modulation scheme, a second coding rate, a second aggregation level, a second number of transmission layers, a second number of antenna ports, or a combination thereof.

28. The method of claim 17, the first set of control channel parameters further comprising a modulation scheme, a coding rate, an antenna port number, a number of transmission layers, a number of antenna ports, or a combination thereof.

29. The method of claim 10, the second set of control channel parameters further comprising a second modulation scheme, a second coding rate, a second aggregation level, a second number of transmission layers, a second number of antenna ports, or a combination thereof.

30. The method of claim 17, wherein the aggregation level determines a number of control information candidates in the wireless node-specific search space.

31. The method of claim 17, wherein the modulating comprises encoding the control information according to the aggregation level.

32. The method of claim 17, wherein the second set of control channel parameters comprises a second aggregation level.

33. The method of claim 17, wherein the time and frequency resource comprises the any symbol of the time slot.

34. The method of claim 17, wherein the wireless node-specific search space is in more than one symbol of the time slot of the subframe.

* * * * *